US012658837B2

(12) United States Patent
Shoji et al.

(10) Patent No.: US 12,658,837 B2
(45) Date of Patent: Jun. 16, 2026

(54) CONTROL APPARATUS AND METHOD OF CONTROLLING THE APPARATUS

(71) Applicant: CANON KABUSHIKI KAISHA, Tokyo (JP)

(72) Inventors: Yuki Shoji, Kanagawa (JP); Yuto Auchi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 18/474,829

(22) Filed: Sep. 26, 2023

(65) Prior Publication Data

US 2024/0120868 A1 Apr. 11, 2024

(30) Foreign Application Priority Data

Sep. 29, 2022 (JP) ................................. 2022-155990

(51) Int. Cl.
  B60K 1/00 (2006.01)
  H02J 50/12 (2016.01)
  H02P 6/00 (2016.01)
  H02P 25/062 (2016.01)

(52) U.S. Cl.
  CPC ............ H02P 25/062 (2016.02); H02J 50/12 (2016.02); H02P 6/006 (2013.01)

(58) Field of Classification Search
  CPC ........ H02P 25/062; H02P 6/006; H02J 50/12; H02J 50/20; H02J 50/40; B60K 1/00
  See application file for complete search history.

(56) References Cited

U.S. PATENT DOCUMENTS

| | | | |
|---|---|---|---|
| 2009/0003022 A1* | 1/2009 | Nunoya .................. | H02J 50/40 |
| | | | 363/78 |
| 2015/0001959 A1 | 1/2015 | Shimokawa | |
| 2021/0126508 A1* | 4/2021 | Ide .......................... | B60K 1/00 |
| 2021/0367453 A1 | 11/2021 | Galigekere et al. | |
| 2023/0098740 A1* | 3/2023 | Asai ........................ | H02J 50/20 |
| | | | 307/142 |

FOREIGN PATENT DOCUMENTS

| | | |
|---|---|---|
| CN | 111713008 A | 9/2020 |
| JP | 2017524327 A | 8/2017 |
| JP | 2018054847 A | 4/2018 |
| JP | 2021072671 A | 5/2021 |
| KR | 20070008576 A | 1/2007 |
| KR | 20170041763 A | 4/2017 |
| TW | 202011664 A | 3/2020 |

* cited by examiner

*Primary Examiner* — Cortez M Cook
(74) *Attorney, Agent, or Firm* — Canon U.S.A., Inc. IP Division

(57) ABSTRACT

A control apparatus includes a driver that outputs power based on a first control signal; a wireless power transmission system that is connected downstream of the driver, that receives first power, and that supplies second power to a motor through wireless power transmission; and a compensator that compensates a difference between a phase of the first control signal and a phase of current output from the wireless power transmission system.

15 Claims, 23 Drawing Sheets

FIG. 2A

VOLTAGE VECTOR →
CURRENT VECTOR ⇢

Vout = Vin
Iout = Iin
Vb
Va
Vc $\theta = 0°$

FIG. 2B

PHASE
DIFFERENCE [deg]

FREQUENCY [Hz]

VOLTAGE VECTOR ———
CURRENT VECTOR — —— —

Vc2

Vc1 phi

FIG. 13B

Vc2
Vin//Vout

Iin

Vb

Vc1

Va

Iout

θ
phi

CONTROL APPARATUS AND METHOD OF CONTROLLING THE APPARATUS

BACKGROUND OF THE INVENTION

Field of the Invention

The disclosure relates to a control apparatus and a method of controlling the control apparatus.

Description of the Related Art

Systems have been proposed in which power is supplied to a linear motor to drive the liner motor. For example, in a semiconductor exposure apparatus, a motor that fine-moves reticle is installed on a reticle stage for moving the reticle to the exposure apparatus. A power supply cable for supplying the power to drive the motor is connected on the stage. Since the power supply cable moves with the movement of the stage, the tension of the cable influences the accuracy of positioning of the stage and the time required to complete the positioning. Accordingly, wireless transmission of the power for driving the motor is considered in order to improve the performance of the semiconductor exposure apparatus.

Japanese Patent Laid-Open No. 2018-54847 discloses a method of arranging a motor driver and a power receiver for wireless power transmission on a coarse-motion stage, wirelessly transmitting direct-current voltage to a power receiver on the coarse-motion stage, and applying the direct-current voltage to the motor driver on the coarse-motion stage. In the method disclosed in Japanese Patent Laid-Open No. 2018-54847, alternating current to be applied to the motor installed on the coarse-motion stage is generated to drive the motor. At this time, an instruction value signal for controlling the magnitude and the plus and minus of the alternating current output from the motor driver is transmitted in common wireless communication, such as Bluetooth (registered trademark).

SUMMARY OF THE INVENTION

A control apparatus includes a driver that outputs power based on a first control signal; a wireless power transmission system that is connected downstream of the driver, that receives first power, and that supplies second power to a motor through wireless power transmission; and a compensator that compensates a difference between a phase of the first control signal and a phase of current output from the wireless power transmission system.

Further features of the present invention will become apparent from the following description of embodiments with reference to the attached drawings.

BRIEF DESCRIPTION OF THE DRAWINGS

FIG. 2A and FIG. 2B illustrate the phase relationship between output current and flowing-into current.

FIG. 4 is a diagram illustrating an example of the specific configuration of the wireless power transmission system.

FIG. 6 is a diagram illustrating a configuration in which power output from the voltage control current source is subjected to wireless power transmission.

FIG. 10 is a diagram illustrating a configuration in which the phase compensator is connected in a control apparatus.

FIG. 12 is a diagram illustrating an example of the configuration of a control apparatus including a phase compensator.

FIG. 13A and FIG. 13B are vector diagrams for describing the advantages of phase compensation by the phase compensator.

DESCRIPTION OF THE EMBODIMENTS

First Embodiment

Figure 1:
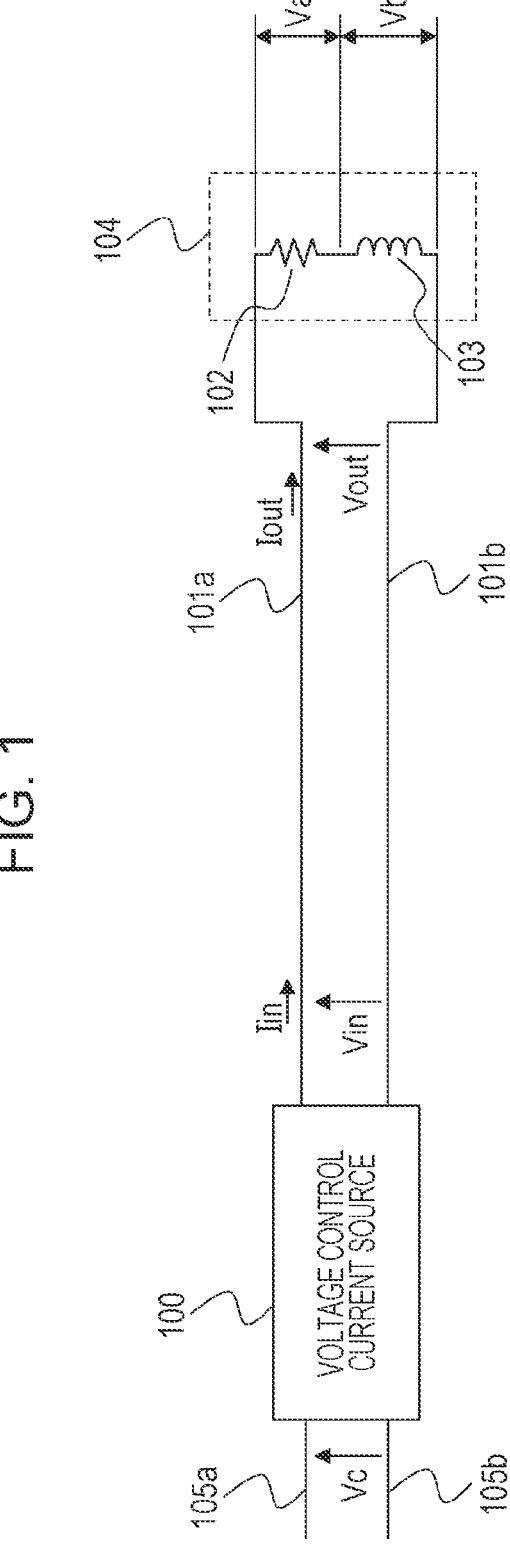
FIG. 1 is a diagram illustrating an example of a voltage control current source that drives a motor in a wired connection state.

FIG. 1 is a diagram illustrating an example of a voltage control current source 100 that drives a motor 104 in a wired connection state. The voltage control current source 100 outputs arbitrary current Iin that is first-order proportional to control voltage Vc input between control voltage input lines 105a and 105b. The motor 104 is capable of being represented by a series circuit composed of a resistor 102 and an inductor 103 as an equivalent circuit. The influence of parasitic capacitance occurring in the actual machine of the motor 104 is ignored for simplicity of description. The voltage control current source 100 is connected to the motor 104 via lead wires 101a and 101b.

The voltage Vc is control voltage input between the control voltage input lines 105a and 105b.

The current Iin is current output from the voltage control current source 100. Voltage Vin is voltage output from the voltage control current source 100. Voltage Va is voltage at both ends of the resistor 102. Voltage Vb is voltage at both ends of the inductor 103. Current Iout is current to flow into the motor 104.

Voltage Vout is voltage at both ends of the motor 104.

Figures 2A, 2B:
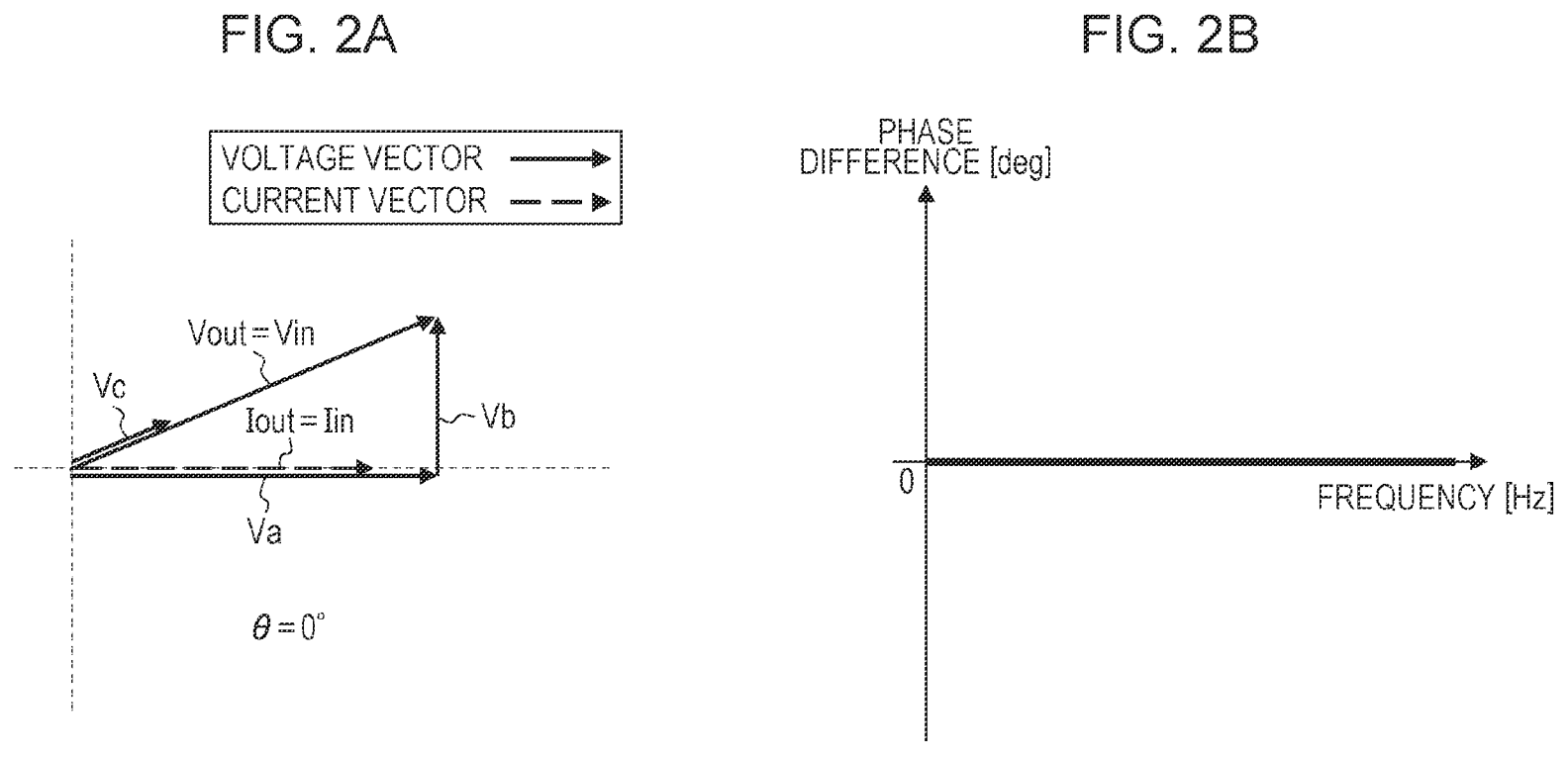

FIG. 2A is a vector diagram indicating the phase relationship between the voltages Vc, Vin, Vout, Va, and Vb and the currents Iin and Iout. Referring to FIG. 2A, the upper direction of the vertical axis represents the orientation of phase lead and the lower direction of the vertical axis represents the orientation of phase lag.

In the configuration illustrated in FIG. 1, the voltage control current source 100 is connected to the motor 104 via the lead wires 101a and 101b. Accordingly, the current Iin output from the voltage control current source 100 is the same as the current Iout to flow into the motor 104. Consequently, the direction of the vector of the current Iin coincides with the direction of the vector of the current Iout, as illustrated in FIG. 2A. In other words, the phase difference between the current Iin and the current Iout is zero.

Attention is given to the phase difference in voltage between the respective components here. Since the vector of the voltage Va with respect to the vector of the current Iout indicates a voltage drop occurring at the resistor 102, the direction of the vector of the voltage Va coincides with the direction of the vector of the current Iout. In other words, the voltage Va has no lead and no lag with respect to the current Iout. In contrast, the vector of the voltage Vb advances by 90 degrees with respect to the vector of the current Iout due to the influence of reactance of the inductor 103. The vector of the voltage Vout, which is represented as combination of the vector of the voltage Va and the vector of the voltage Vb, advances with respect to the vector of the current Iout. In reverse representation of the reference of the voltage and the current, the vector of the current Iout is delayed with respect to the vector of the voltage Vout.

FIG. 2B is a graph indicating the phase difference between the current Iin output from the voltage control current source 100 and the current Iout to flow into the motor 104 in a frequency domain. Since the current Iin output from the voltage control current source 100 is the same as the current Iout to flow into the motor 104, no phase difference occurs. Accordingly, as illustrated in FIG. 2B, the phase difference between the current Iin output from the voltage control current source 100 and the current Iout to flow into the motor 104 is zero at all frequencies.

Consequently, in the configuration illustrated in FIG. 1, varying the amplitude or the phase of the control voltage Vc enables the current Iin output from the voltage control current source 100 to be varied to control the current Iout to flow into the motor 104. At this time, the phase difference between the current Iin output from the voltage control current source 100 and the current Iout to flow into the motor 104 is constantly zero (also viewed in the frequency domain). A control apparatus that drives the motor with current output from a wireless power transmission system will now be described.

Figure 3:
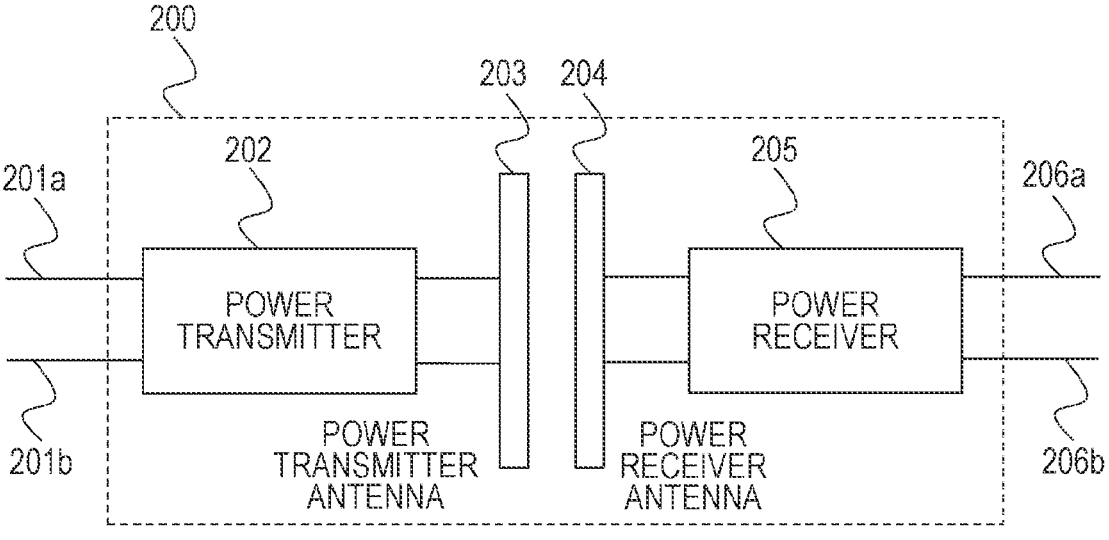
FIG. 3 is a diagram illustrating an example of the configuration of a wireless power transmission system.

FIG. 3 is a diagram illustrating an example of the configuration of a wireless power transmission system 200 according to a first embodiment.

The wireless power transmission system 200 includes a power transmitter 202, a power transmitter antenna 203, a power receiver antenna 204, and a power receiver 205. Lead wires 201a and 201b are paths through which power is supplied to the wireless power transmission system 200. Lead wires 206a and 206b are paths through which power output from the wireless power transmission system 200 is supplied to the motor. The power transmitter 202 switches the power supplied through the lead wires 201a and 201b and feeds the switched power to the power transmitter antenna 203. The power transmitter antenna 203 and the power receiver antenna 204 are arranged so as to be apart from each other by a distance achieving significant coupling with an electromagnetic field. The power receiver antenna 204 supplies part of electromagnetic field energy generated by the power transmitter antenna 203 to the power receiver 205. The power receiver 205 smooths the power supplied from the power receiver antenna 204. In the description of the first embodiment, the power transmission efficiency of the wireless power transmission system 200 is not argued. The advantages of the first embodiment are produced regardless of the power transmission efficiency. It is assumed that the wireless power transmission system 200 performs a liner operation. In other words, the power supplied through the lead wires 201a and 201b has linear relationship with the power output through the lead wires 206a and 206b.

Figure 4:
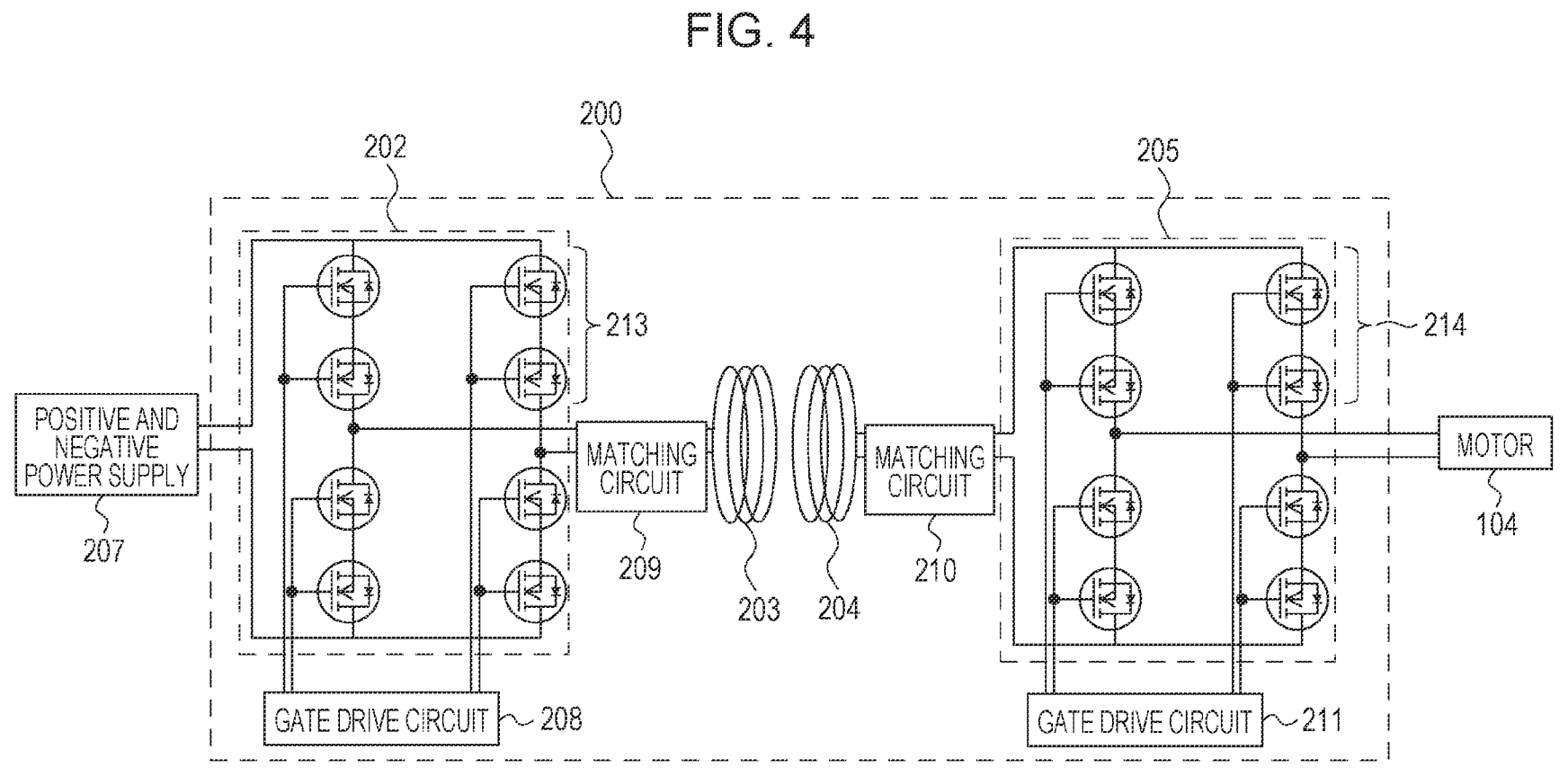

FIG. 4 is a diagram illustrating an example of the specific configuration of the wireless power transmission system 200. The wireless power transmission system 200 receives positive or negative voltage from a positive and negative power supply 207 and supplies the positive or negative voltage to the motor 104. The motor 104 is an example of a load. The wireless power transmission system 200 includes the power transmitter 202, the power transmitter antenna 203, the power receiver antenna 204, the power receiver 205, a gate drive circuit 208, a matching circuit 209, a matching circuit 210, and a gate drive circuit 211.

The power transmitter 202 includes four bi-directional switches 213. In each of the bi-directional switches 213, the sources of two field effect transistors (FETs) are connected to each other and the gates of the two FETs are connected to each other. The bi-directional switch 213 is driven with the same gate drive signal that operates based on source potential. The gate drive circuit 208 supplies the gate drive signal to each of the four bi-directional switches 213.

The power receiver 205 includes four bi-directional switches 214. In each of the bi-directional switches 214, the sources of two field effect transistors (FETs) are connected to each other and the gates of the two FETs are connected to each other. The bi-directional switch 214 is driven with the same gate drive signal that operates based on the source potential. The gate drive circuit 211 supplies the gate drive signal to each of the four bi-directional switches 214.

The positive and negative power supply 207 outputs positive or negative direct-current voltage. The amplitude of the voltage output from the positive and negative power supply 207 determines thrust of the motor 104. The positive or negative sign of the voltage output from the positive and negative power supply 207 determines the orientation in which the motor 104 moves.

The gate drive circuit 208 supplies the gate drive signal of a predetermined frequency to the four bi-directional switches 213. The four bi-directional switches 213 switch the direct-current voltage output from the positive and negative power supply 207 in synchronization with the gate drive signal to convert the direct-current voltage output from the positive and negative power supply 207 into alternating-current voltage. The four bi-directional switches 213 apply the alternating-current voltage to the power transmitter antenna 203 via the matching circuit 209. The power transmitter antenna 203 generates the electromagnetic field energy and wirelessly transmits the power to the power receiver antenna 204. For example, the matching circuit 209 is a capacitor and the power transmitter antenna 203 is a coil. The matching circuit 209 and the power transmitter antenna 203 serve as a resonant circuit that resonates at the same frequency as that of the bi-directional switches 213.

The power receiver antenna 204 supplies part of the electromagnetic field energy generated by the power transmitter antenna 203 to the power receiver 205 via the matching circuit 210. For example, the power receiver antenna 204 is a coil and the matching circuit 210 is a capacitor. The power receiver antenna 204 and the matching circuit 210 serve as a resonant circuit that resonates at the same frequency as that of the bi-directional switches 213.

The power receiver 205 is a full-bridge synchronous rectifier using the bi-directional switches 214 that perform the switching at the same frequency as that of the bi-directional switches 213 and is adjusted so as to perform the switching in the phase producing the highest power reception efficiency. The power receiver 205 converts the alternating-current voltage supplied from the power receiver antenna 204 into the direct-current voltage and supplies the direct-current voltage to the motor 104.

Figure 5:
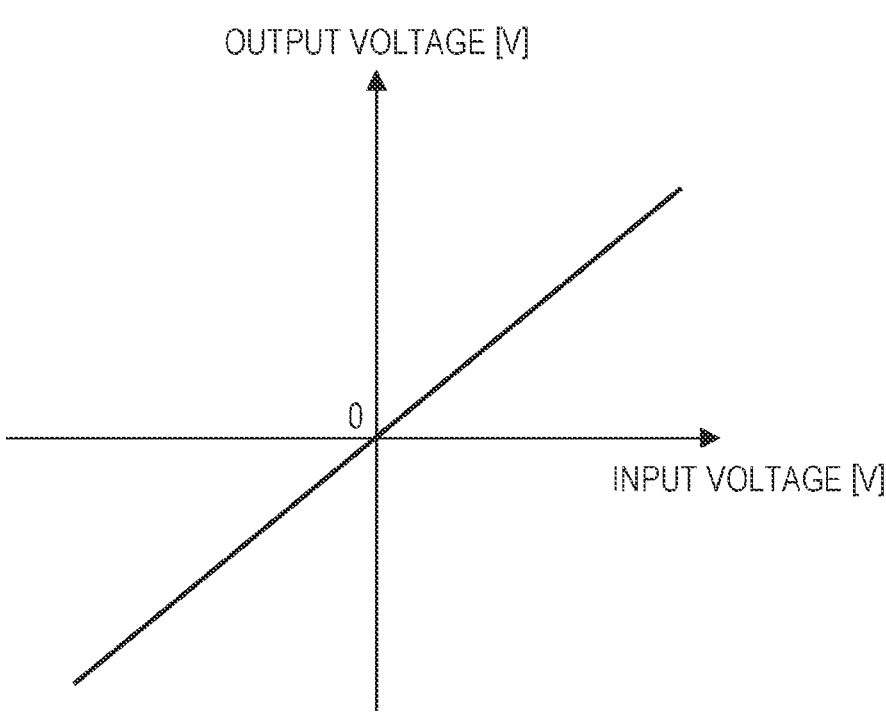
FIG. 5 is a graph indicating the relationship between voltage input into the wireless power transmission system and voltage output from the wireless power transmission system.

FIG. 5 is a graph indicating the relationship between the voltage input into the wireless power transmission system 200 in FIG. 4 and the voltage output from the wireless power transmission system 200 in FIG. 4. The voltage input into the wireless power transmission system 200 is the same as the voltage output from the positive and negative power supply 207. The voltage input into the wireless power transmission system 200 is the same as the voltage input into the motor 104. The voltage input into the wireless power transmission system 200 and the voltage output from the wireless power transmission system 200 have positive first-order linear relationship. The input-output relationship illustrated in FIG. 5 is established in a case in which the gate drive signals output from the gate drive circuit 208 and the gate drive circuit 211 are in a synchronized state and the phase difference between the gate drive signals output from the gate drive circuit 208 and the gate drive circuit 211 is appropriately adjusted.

The wireless power transmission system 200 illustrated in FIG. 4 is capable of performing wireless power transmission of the negative voltage. A general wireless power transmission system that does not use the bi-directional switches 213 and 214 is not capable of performing the wireless power transmission of the negative voltage. This is because, upon input of the negative voltage, a body diode of the FET (or a parasitic element corresponding to the body diode) is made conductive and the FET is in a conductive state regardless of the state of the gate drive signal, thus causing an uncontrollable state.

Since the wireless power transmission system 200 illustrated in FIG. 4 is capable of performing the wireless power transmission of the negative voltage, for example, it is possible to perform direct wireless power transmission of driving power of the motor 104. Specifically, in a normal rotation operation and a reverse rotation operation of the motor 104 in FIG. 1, the current value to flow into the motor 104 is capable of being output from the voltage control current source 100 and the power output from the voltage control current source 100 is capable of being subjected to the wireless power transmission by the wireless power transmission system 200 illustrated in FIG. 4. In other words, the positive and negative power supply 207 in FIG.

4 corresponds to the voltage control current source 100 in FIG. 1. At this time, the control voltage corresponding to the current value to flow into the motor 104 is input into the voltage control current source 100 as the control voltage Vc.

Figure 6:
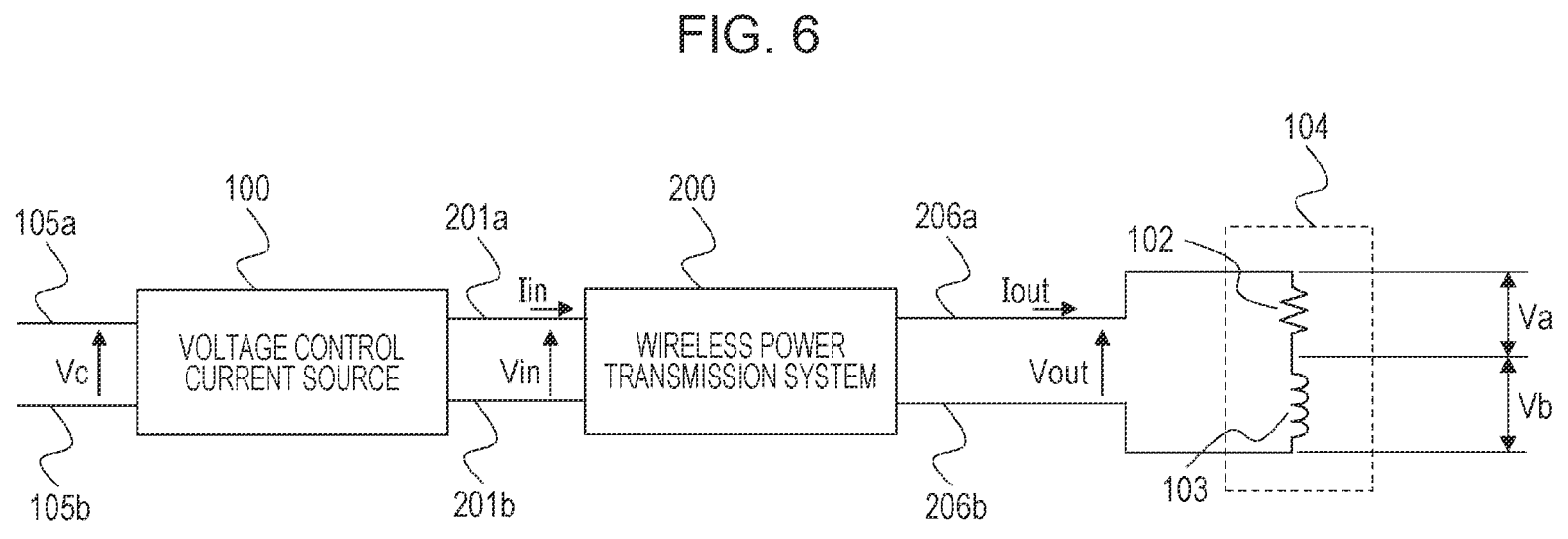

FIG. 6 is a diagram illustrating a configuration in which the wireless power transmission system 200 in FIG. 4 performs the wireless power transmission of the power output from the voltage control current source 100 in FIG. 1. The wireless power transmission system 200 in FIG. 4 is provided between the voltage control current source 100 and the motor 104 in the configuration in FIG. 6, unlike the configuration in FIG. 1. The wireless power transmission system 200 wirelessly transmits the power output from the voltage control current source 100 and supplies the power to the motor 104.

The voltage control current source 100 is connected to the wireless power transmission system 200 via the lead wires 201a and 201b. The wireless power transmission system 200 is connected to the motor 104 via the lead wires 206a and 206b.

The current Iin is current output from the voltage control current source 100. The voltage Vin is voltage input between the lead wires 201a and 201b. The voltage Vout is voltage between the lead wires 206a and 206b. The current Iout is current to flow into the motor 104.

In the actual wireless power transmission system, time delay corresponding to several tens of periods of a switching frequency of the power transmitter 202 may occur between the voltage Vin and the voltage Vout. However, the switching frequency of the power transmitter 202 is generally about several tens of times to about one thousand of times higher than a control frequency of the motor 104. For example, the control frequency of the motor 104 is about 10 kHz while a frequency of 100 kHz to 15,000 kHz is selected as the switching frequency of the power transmitter 202. In the light of the above precondition, the delay between the voltage Vin and the voltage Vout, which is caused by the wireless power transmission system 200 in FIG. 6, is capable of being ignored in the first embodiment. The advantages of the first embodiment are not phenomena specifically produced with this precondition. This precondition is within an extremely reasonable range in a logical description of the first embodiment. In addition, there are cases in which the time delay occurring between the voltage Vin and the voltage Vout is too long to ignore with respect to the control frequency of the motor 104. In such a case, a mode may be applicable in which the time delay (the phase difference) occurring between the voltage Vin and the voltage Vout is included in an amount of phase compensation of phase compensators 300 and 400 described below.

The relationship between the current Iin output from the voltage control current source 100 and the current Iout to flow into the motor 104 when the configuration in FIG. 6 is used will now be considered. In the voltage control current source 100 in which the motor 104 is driven in the wired connection state in FIG. 1, the phase difference between the current Iin output from the voltage control current source 100 and the current Iout to flow into the motor 104 is zero, as indicated in FIG. 2A. When the motor 104 is to be controlled, the state in which the phase difference between the current Iin output from the voltage control current source 100 and the current Iout to flow into the motor 104 is zero is considered to be most appropriate.

Figures 7A, 7B:
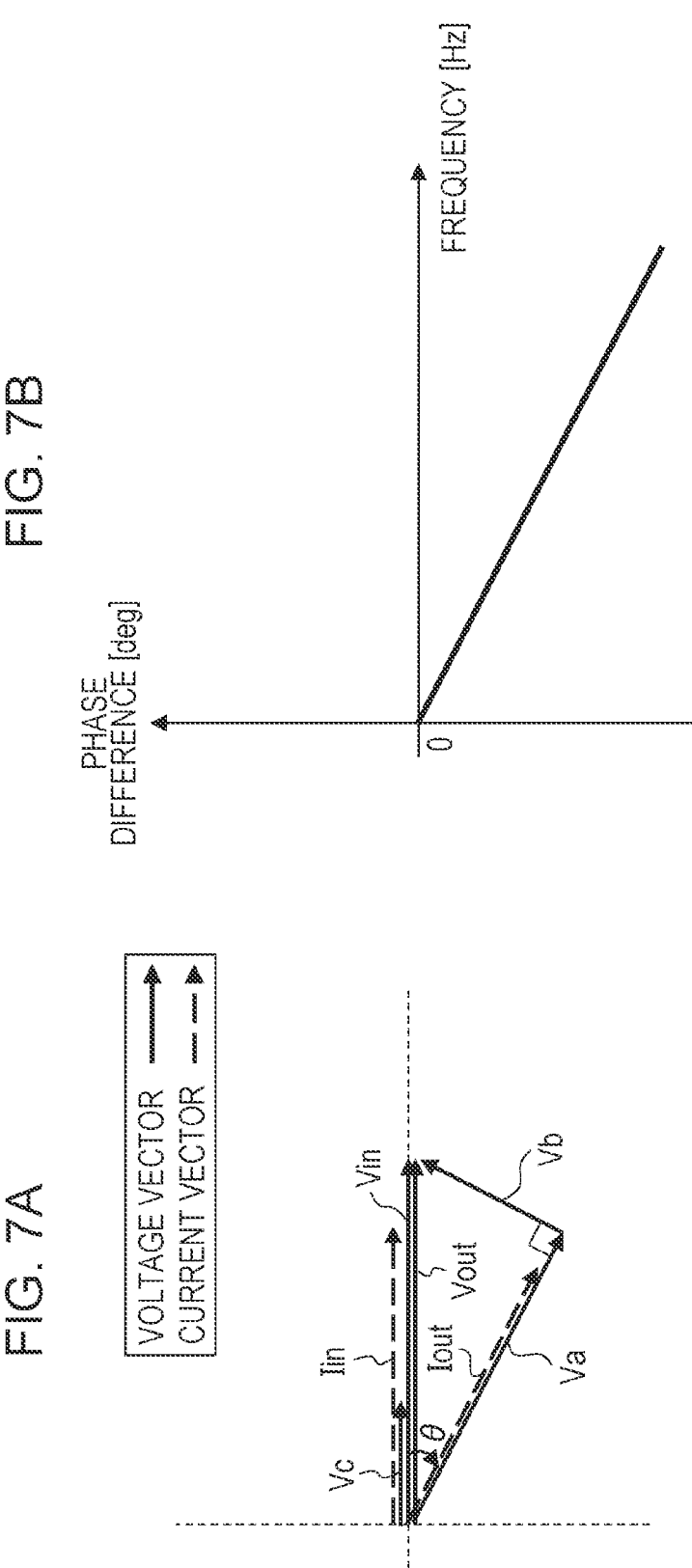
FIG. 7A and FIG. 7B illustrate the phase relationship between the output current and the flowing-into current.

The phase relationship between the current Iin output from the voltage control current source 100 and the voltage Vout to flow into the motor 104 will now be described with reference to FIG. 7A and FIG. 7B. FIG. 7A is a vector diagram indicating the phase relationship between the voltages Vc, Vin, Vout, Va, and Vb and the currents Iin and Iout in FIG. 6. Referring to FIG. 7A, the upper direction of the vertical axis represents the orientation of the phase lead and the lower direction of the vertical axis represents the orientation of the phase lag.

The phase of the control voltage Vc input into the voltage control current source 100 coincides with the phase of the current Iin output from the voltage control current source 100, as described above. Accordingly, the direction of the vector of the control voltage Vc coincides with the direction of the vector of the current Iin. Input impedance of the wireless power transmission system 200 is capable of being considered as actual resistance when viewed from an output terminal of the voltage control current source 100. This is because the switching frequency of the power transmitter 202 is generally about several tens of times to about one thousand of times higher than the control frequency of the motor 104 and a smoothing effect of a decoupling capacitor connected to a power supply input terminal of the wireless power transmission system 200 exists. Accordingly, little influence of the switching of the power transmitter 202 is exerted on the output terminal of the voltage control current source 100. The decoupling capacitor is constantly connected in a general designing method.

Consequently, the input impedance of the wireless power transmission system 200 is hereinafter considered as actual resistance. In this case, the voltage input into the wireless power transmission system 200 (the voltage output from the voltage control current source 100) Vin is proportional to the current Iin output from the voltage control current source 100. In other words, the direction of the vector of the voltage Vin coincides with the direction of the vector of the current Iin. As assumed in the manner described above, since the wireless power transmission system 200 immediately outputs the voltage Vin input between the lead wires 201a and 201b as the voltage Vout between the lead wires 206a and 206b, the direction of the vector of the voltage Vin coincides with the direction of the vector of the voltage Vout. Since the phase relationship between the vector of the voltage Vout and the vector of the current Iout is the same as the relationship described above with reference to FIG. 2A, a description of the phase relationship between the vector of the voltage Vout and the vector of the current Iout is omitted herein. In conclusion, the current Iout is delayed with respect to the vector of the voltage Vout (≈Vin). Since the direction of the vector of the voltage Vin coincides with the direction of the vector of the current Iin, the vector of the current Iout is delayed with respect to the vector of the current Iin.

Referring to FIG. 7A, a phase difference θ is the phase difference (an amount of lag) of the current Iout with respect to the current Iin. The phase difference θ is represented by Expression (1). In Expression (1), ω denotes an angular frequency of the control voltage Vc, L denotes the inductance of the inductor 103, and R denotes the resistance value of the resistor 102.

[Formula 1]

$$\theta = -\tan^{-1}\left(\frac{\omega L}{R}\right) \tag{1}$$

FIG. 7B is a graph in which the phase difference is represented in the frequency domain. The phase difference between the current Iin output from the voltage control current source 100 and the current Iout to flow into the motor 104 is zero for all frequencies in FIG. 2B. In contrast, the absolute value of the phase difference (the amount of lag) θ is monotonically increased with the increasing frequency in FIG. 7B. In the configuration in FIG. 6, the property in which the absolute value of the phase difference θ is monotonically increased with the increasing frequency, as in FIG. 7B, is not desirable. For example, when the driving of the motor 104 is to be started at the angular frequency ω at a time 0, it is assumed that the control voltage Vc at the angular frequency ω is input into the voltage control current source 100 at the time 0. In such a case, the motor 104 starts to operate at a time d delayed by the time corresponding to the phase difference θ represented by Expression (1). The time d is represented by Expression (2):

[Formula 2]

$$d = \left|\frac{2\theta}{\omega}\right| \tag{2}$$

Ideally, the phase difference between the current Iin output from the voltage control current source 100 and the current Iout to flow into the motor 104 is zero for all frequencies, as indicated in FIG. 2B. However, when the motor 104 is driven with the power output from the wireless power transmission system 200 in the configuration in FIG. 6, the timing (the phase) at which the motor 104 operates is delayed with respect to the control voltage Vc. In addition, the amount of lag is monotonically increased with the increasing frequency.

This is the problem to be resolved in the first embodiment. Specifically, the problem in the first embodiment is the difference that occurs between the phase of the current Iin input into the wireless power transmission system 200 and the phase of the current Iout output from the wireless power transmission system 200, which is caused by the electrical property of the wireless power transmission system 200. In order to resolve the above problem, the phase compensator is adopted.

Figure 8:
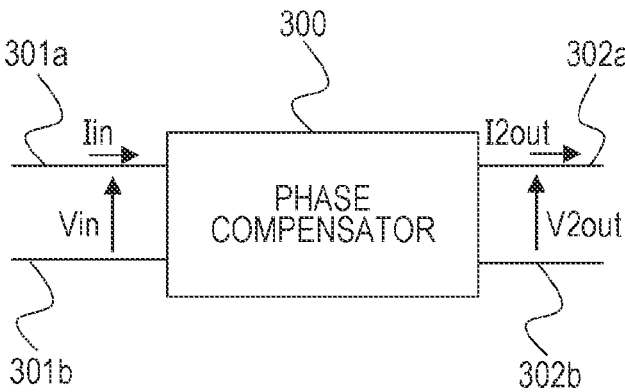
FIG. 8 is a diagram illustrating a phase compensator.

FIG. 8 is a diagram illustrating the phase compensator 300 according to the first embodiment. Lead wires 301a and 301b are connected to an input portion of the phase compensator 300. Lead wires 302a and 302b are connected to an output portion of the phase compensator 300. The current Iin is current input into the phase compensator 300 through the lead wires 301a and 301b. The voltage Vin is voltage input between the lead wires 301a and 301b. Voltage V2out is voltage output between the lead wires 302a and 302b by the phase compensator 300. Current I2out is current output from the phase compensator 300 to the lead wires 302a and 302b. The phase compensator 300 is described to operate as an electric circuit. The phase compensator 300 may be installed as software using digital operations. Similarly, the phase compensator 300 may be installed as a logic circuit using a field programmable gate array (FPGA). Put another way, the phase compensator may be realized through a digital implementation or an analogue implementation or a combination of a digital and analogue.

Figure 9:
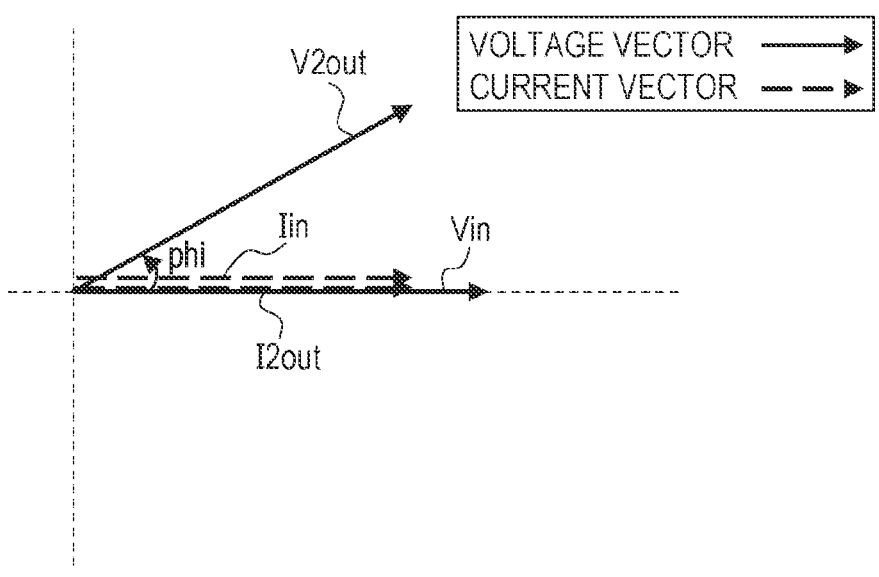
FIG. 9 is a vector diagram for describing the advantages of phase compensation by the compensator.

FIG. 9 is a vector diagram for describing the advantages of phase compensation by the phase compensator 300 in FIG. 8. Referring to FIG. 9, the upper direction of the vertical axis represents the orientation of the phase lead. In contrast, the lower direction of the vertical axis represents the orientation of the phase lag. The phase compensator 300 functions so as to advance the voltage V2out by an amount of phase compensation φ with reference to the voltage Vin input between the lead wires 301a and 301b. In the electric circuit, the phase compensator 300 varies a power factor by the amount of phase compensation cp. In other words, the vector of the voltage V2out output between the lead wires 302a and 302b is oriented to a direction that advances by the angle φ with respect to the vector of the voltage Vin input between the lead wires 301a and 301b in FIG. 9. In contrast, the vector of the current I2out output from the phase compensator 300 is oriented to the same direction as that of the vector of the voltage Vin input between the lead wires 301a and 301b. How to resolve the above problem using the phase compensator 300 described above with reference to FIG. 8 and FIG. 9 will be described.

Figure 10:
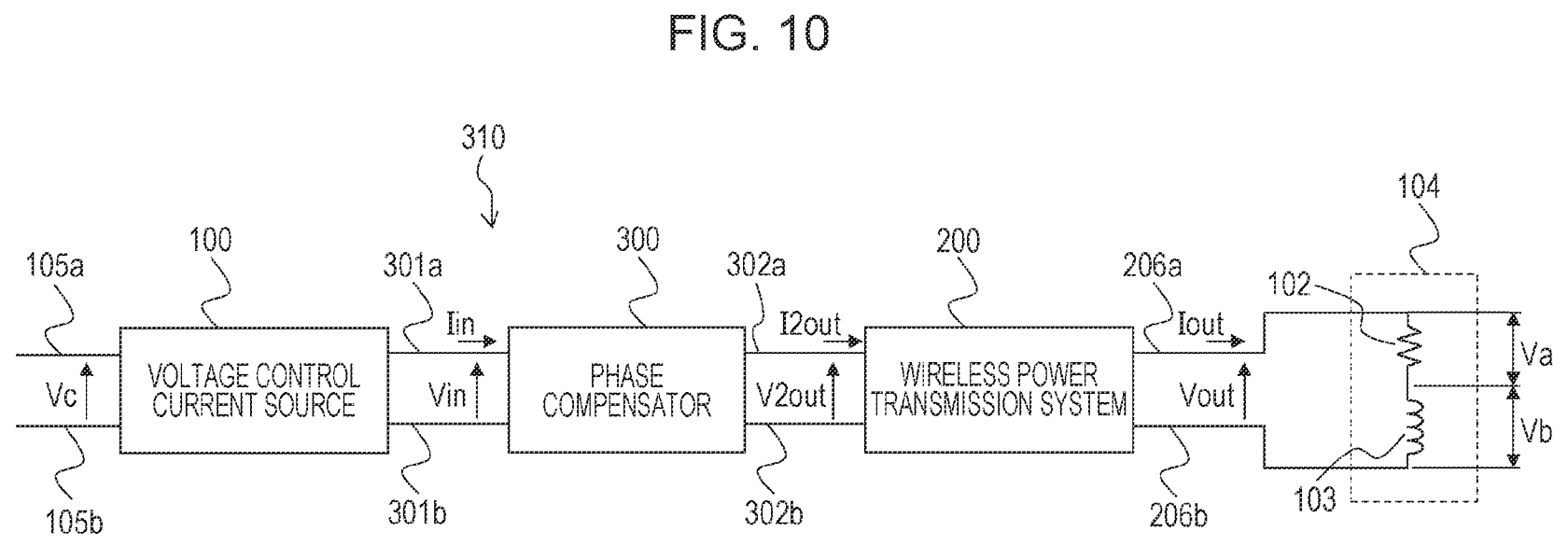

FIG. 10 is a diagram illustrating an example of the configuration of a control apparatus 310 according to the first embodiment. The control apparatus 310 includes the voltage control current source 100, the phase compensator 300, the wireless power transmission system 200, and the motor 104. A method of controlling the control apparatus 310 will now be described.

The voltage control current source 100 outputs arbitrary current Iin first-order proportional to the control voltage Vc input between the control voltage input lines 105a and 105b. The voltage control current source 100 is connected to the phase compensator 300 via the lead wires 301a and 301b. The current Iin is current output from the voltage control current source 100. The voltage Vin is voltage input between the lead wires 301a and 301b. The phase of the current Iin coincides with the phase of the voltage Vin, as indicated in FIG. 9.

The phase compensator 300 outputs the voltage V2out resulting from compensation of the phase of the voltage Vin. The voltage V2out is voltage the phase of which advances by the amount of phase compensation φ with respect to the voltage Vin, as illustrated in FIG. 9. The phase compensator 300 is connected to the wireless power transmission system 200 via the lead wires 302a and 302b. The voltage V2out is voltage output between the lead wires 302a and 302b by the phase compensator 300. The current I2out is current output from the phase compensator 300. The phase of the current I2out coincides with the phase of the current Iin, as indicated in FIG. 9.

The wireless power transmission system 200 receives the power of the voltage V2out, wirelessly transmits the power, and outputs the power of the voltage Vout. The wireless power transmission system 200 is connected to the motor 104 via the lead wires 206a and 206b. The voltage Vout is voltage output between the lead wires 206a and 206b by the wireless power transmission system 200. The current Iout is current output from the wireless power transmission system 200 to the motor 104. The motor 104 is capable of being represented by a series circuit composed of the resistor 102 and the inductor 103. The voltage Va is voltage at both ends of the resistor 102. The voltage Vb is voltage at both ends of the inductor 103.

Figure 11:
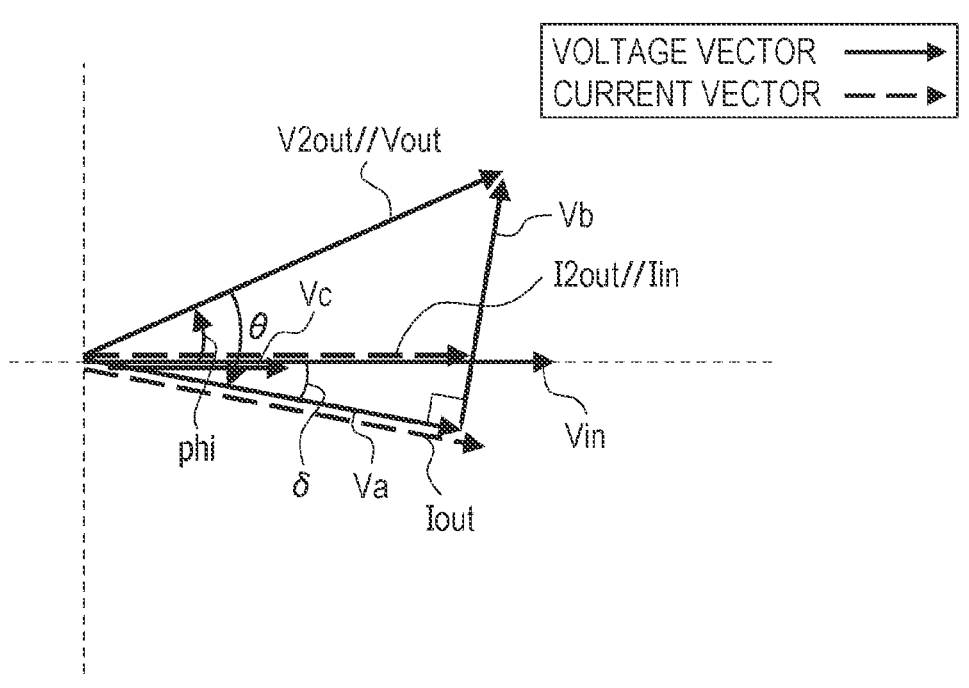
FIG. 11 is a vector diagram indicating the phase relationship between voltages and currents.

The phase relationship between the current Iin output from the voltage control current source 100 in FIG. 10 and the current Iout to flow into the motor 104 will now be described with reference to FIG. 11. FIG. 11 is a vector diagram indicating the phase relationship between the voltages Vc, Vin, V2out, Vout, Va, and Vb and the currents Iin, I2out and Iout in FIG. 10. Referring to FIG. 11, the upper direction of the vertical axis represents the orientation of the phase lead and the lower direction of the vertical axis represents the orientation of the phase lag.

The phase of the control voltage Vc input into the voltage control current source 100, the phase of the voltage Vin output from the voltage control current source 100, and the phase of the current Iin output from the voltage control current source 100 coincide with each other, as described above. Accordingly, the direction of the vector of the control voltage Vc, the direction of the vector of the voltage Vin, and the direction of the vector of the current Iin coincide with each other.

Referring to FIG. 9, the phase difference φ in the phase lead direction occurs between the voltage Vin input into the phase compensator 300 and the voltage V2out output from the phase compensator 300. Accordingly, the vector of the voltage V2out is oriented to a direction that advances with respect to the vector of the voltage Vin by the angle φ in FIG. 11.

The phase of the current Iin input into the phase compensator 300 coincides with the phase of the current I2out output from the phase compensator 300, and the linear relationship is established between the phase of the current Iin input into the phase compensator 300 and the phase of the current I2out output from the phase compensator 300. Accordingly, the direction of the vector of the current Iin coincides with the direction of the vector of the current I2out.

The linear relationship is established between the voltage V2out input into the wireless power transmission system 200 and the voltage Vout output from the wireless power transmission system 200. In other words, the direction of the vector of the voltage V2out coincides with the direction of the vector of the voltage Vout. Since the wireless power transmission system 200 immediately outputs the voltage V2out input between the lead wires 302a and 302b as the voltage Vout between the lead wires 206a and 206b, as described above, the direction of the vector of the voltage V2out coincides with the direction of the vector of the voltage Vout.

The phase relationship between the voltages Vout, Va, and Vb and the current Iout is the same as the relationship described above with reference to FIG. 7A. Specifically, since the vector of the voltage Va with respect to the vector of the current Iout indicates a voltage drop occurring at the resistor 102, the direction of the vector of the voltage Va coincides with the direction of the vector of the current Iout. In other words, the voltage Va has no lead and no lag with respect to the current Iout. In contrast, the vector of the voltage Vb advances by 90 degrees with respect to the vector of the current Iout due to the influence of the reactance of the inductor 103. The vector of the voltage Vout, which is represented as combination of the vector of the voltage Va and the vector of the voltage Vb, advances by the phase difference θ with respect to the vector of the current Iout. In reverse representation of the reference of the voltage and the current, the vector of the current Iout is delayed with respect to the vector of the voltage Vout by the phase difference θ. The phase difference θ is represented by Expression (1). The vector diagram when the relationship according to Expression (3) is established is indicated in FIG. 11.

[Formula 3]

$$|\varphi| < |\theta| \qquad (3)$$

In this case, a phase difference (an amount of lag) δ occurs between the current Iin output from the voltage control current source 100 and the current Iout to flow into the motor 104, as represented by Expression (4):

[Formula 4]

$$\delta = |\varphi| - |\theta| \qquad (4)$$

How to minimize the phase difference δ between the current Iin output from the voltage control current source 100 and the current Iout to flow into the motor 104 will now be considered. As apparent from Expression (4), the phase difference δ and the amount of phase compensation φ are to be adjusted so as to be substantially equal to each other. In other words, it is possible to minimize the phase difference δ between the current Iin output from the voltage control current source 100 and the current Iout to flow into the motor 104 by adjusting the amount of phase compensation φ of the phase compensator 300 so as to establish Expression (5):

[Formula 5]

$$|\varphi| \approx |\theta| = \tan^{-1}\left(\frac{\omega L}{R}\right) \qquad (5)$$

At this time, Expression (6) is established and the phase difference δ is approximately zero.

[Formula 6]

$$\delta = 0 \qquad (6)$$

In sum, when the motor 104 is driven with the power output from the wireless power transmission system 200 in the configuration illustrated in FIG. 10, the amount of phase compensation φ of the phase compensator 300 is adjusted so as to meet Expression (5). This minimizes the phase difference δ between the control voltage Vc and the current Iout to flow into the motor 104 to suppress a delay of the timing (phase) at which the motor 104 operates with respect to the control voltage Vc.

As described above, the problem of the first embodiment is the difference occurring between the phase of the control voltage Vc and the phase of the current Iout for driving the motor 104. According to the first embodiment, the control apparatus 310 is capable of resolving the above problem by adopting the phase compensator 300 having the appropriate amount of phase compensation φ so as to meet Expression (5).

Figures 22A, 22B:
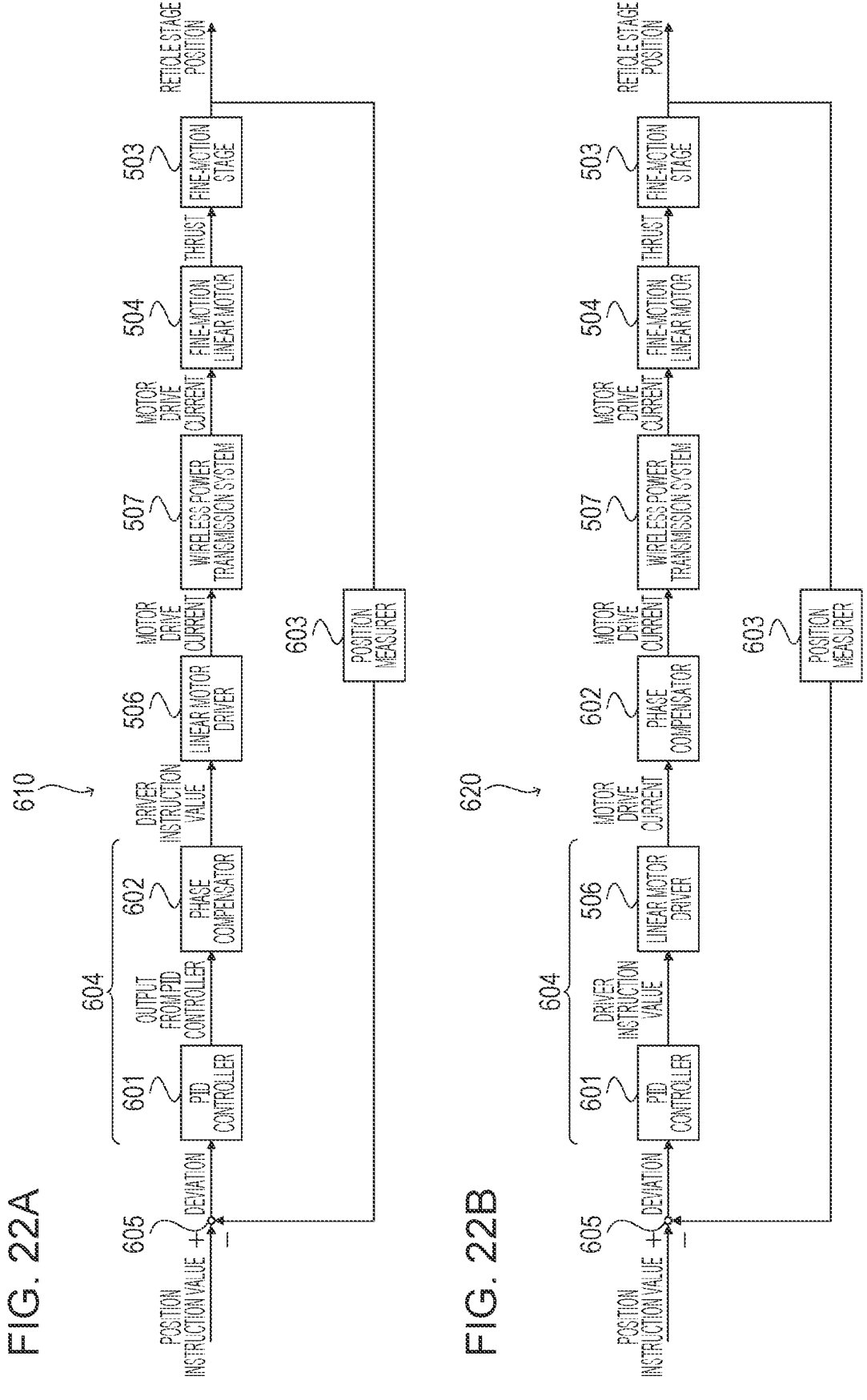
FIG. 22A and FIG. 22B are diagrams illustrating examples of the configurations of control apparatuses each including a phase compensator.

As described above, the voltage control current source 100 is an example of a linear motor driver 506 illustrated in FIG. 22A and FIG. 22B and outputs the power based on the control voltage Vc. The control voltage Vc is an example of a control signal. The wireless power transmission system 200 is connected downstream of the voltage control current source 100. The wireless power transmission system 200 receives first power and supplies second power to the motor 104 through the wireless power transmission. The phase compensator 300 is a compensator and compensates the difference between the phase of the control voltage Vc and the phase of the current Iout output from the wireless power transmission system 200.

As indicated in FIG. 11, the phase of the current Iout output from the wireless power transmission system 200 is delayed with respect to the phase of the voltage Vout output from the wireless power transmission system 200. The phase compensator 300 is provided between the voltage control current source 100 and the wireless power transmission system 200. The phase compensator 300 receives the power output from the voltage control current source 100, and supplies the first power, in which the phase of the voltage V2out input into the wireless power transmission system 200 advances with respect to the phase of the voltage Vin output from the voltage control current source 100, to the wireless power transmission system 200.

As illustrated in FIG. 4, the wireless power transmission system 200 includes the power transmitter antenna 203, the power receiver antenna 204, the power transmitter 202, and the power receiver 205. The power transmitter antenna 203 is an antenna for the wireless power transmission. The power receiver antenna 204 wirelessly receives the power of the power transmitter antenna 203. The power transmitter 202 is a switch circuit. The power transmitter 202 switches the input power based on a first switching signal from the gate drive circuit 208 and applies the voltage to the power transmitter antenna 203. The power receiver 205 is a rectifier circuit. The power receiver 205 rectifies the voltage output from the power receiver antenna 204 based on a second switching signal from the gate drive circuit 211 and applies the rectified voltage to the motor 104. The power transmitter 202 includes the multiple bi-directional switches 213. The power receiver 205 includes the multiple bi-directional switches 214.

The first switching signal has the same period as that of the second switching signal. The bi-directional switches 213 in the power transmitter 202 are driven with the first switching signal based on the potential of source terminals of the bi-directional switches 213. The bi-directional switches 214 in the power receiver 205 are driven with the second switching signal based on the potential of source terminals of the bi-directional switches 214.

As described above, according to the first embodiment, the control apparatus 310 drives the motor 104 with the current Iout output from the wireless power transmission system 200. The phase compensator 300 compensates the difference occurring between the phase of the control voltage Vc input into the control apparatus 310 and the phase of the current Iout for driving the motor 104, which is output from the wireless power transmission system 200, due to the electrical property of the wireless power transmission system 200. Reducing the difference by the phase compensator 300 enables a control speed and a control accuracy of the motor 104 to be improved.

Second Embodiment

Figure 12:
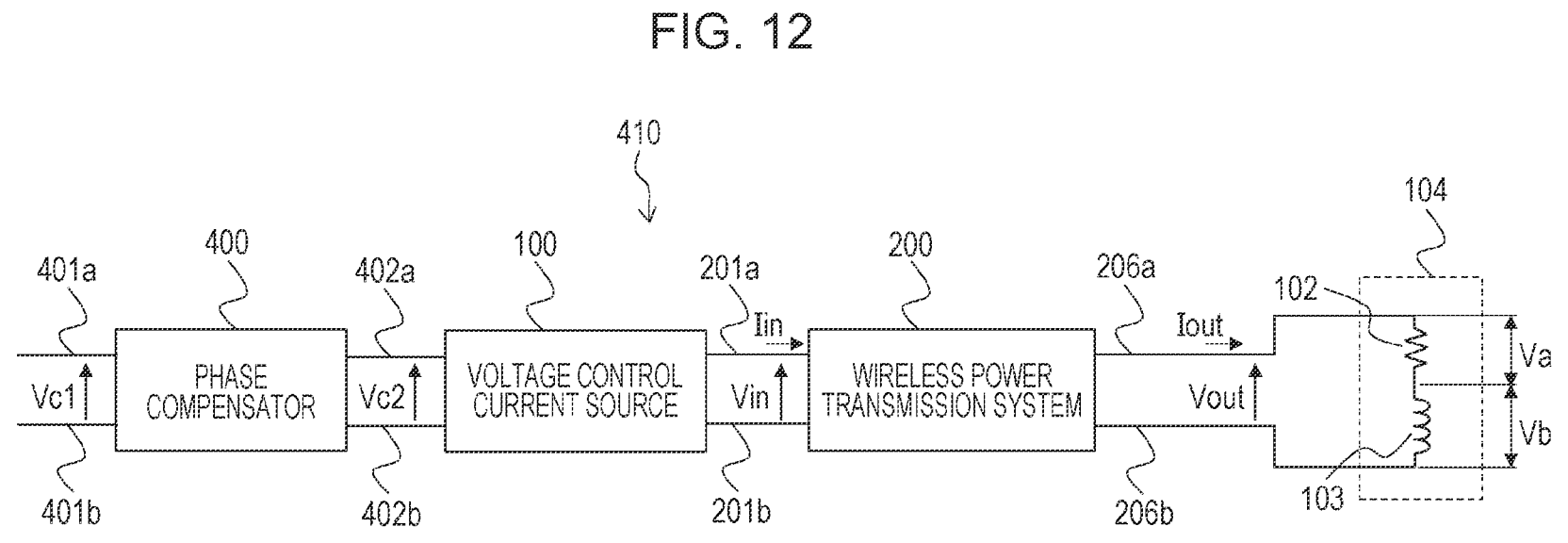

FIG. 12 is a diagram illustrating an example of the configuration of a control apparatus 410 according to a second embodiment. The control apparatus 410 includes a phase compensator 400, the voltage control current source 100, the wireless power transmission system 200, and the motor 104. The phase compensator 400 is provided upstream of the voltage control current source 100 and has the same function as that of the phase compensator 300 of the first embodiment.

Lead wires 401a and 401b are connected to an input portion of the phase compensator 400. The phase compensator 400 is connected to the voltage control current source 100 via lead wires 402a and 402b. The phase compensator 400 receives control voltage Vc1 between the lead wires 401a and 401b, performs the phase compensation of the amount of phase compensation gyp, and outputs control voltage Vc2 between the lead wires 402a and 402b. The control voltage Vc2 is voltage resulting from advancing the phase of the control voltage Vc1 by the amount of phase compensation φ.

The voltage control current source 100 outputs arbitrary current Iin first-order proportional to the control voltage Vc2 input between the lead wires 402a and 402b. The voltage control current source 100 is connected to the wireless power transmission system 200 via the lead wires 201a and 201b. The current Iin is current output from the voltage control current source 100. The voltage Vin is voltage output between the lead wires 201*a* and 201*b* by the voltage control current source 100.

The wireless power transmission system 200 receives the power of the voltage Vin, wirelessly transmits the power, and outputs the power of the voltage Vout. The wireless power transmission system 200 is connected to the motor 104 via the lead wires 206*a* and 206*b*. The voltage Vout is voltage output between the lead wires 206*a* and 206*b* by the wireless power transmission system 200. The current Iout is current output from the wireless power transmission system 200 to the motor 104. The motor 104 is capable of being represented by a series circuit composed of the resistor 102 and the inductor 103. The voltage Va is voltage at both ends of the resistor 102. The voltage Vb is voltage at both ends of the inductor 103.

Figures 13A, 13B:
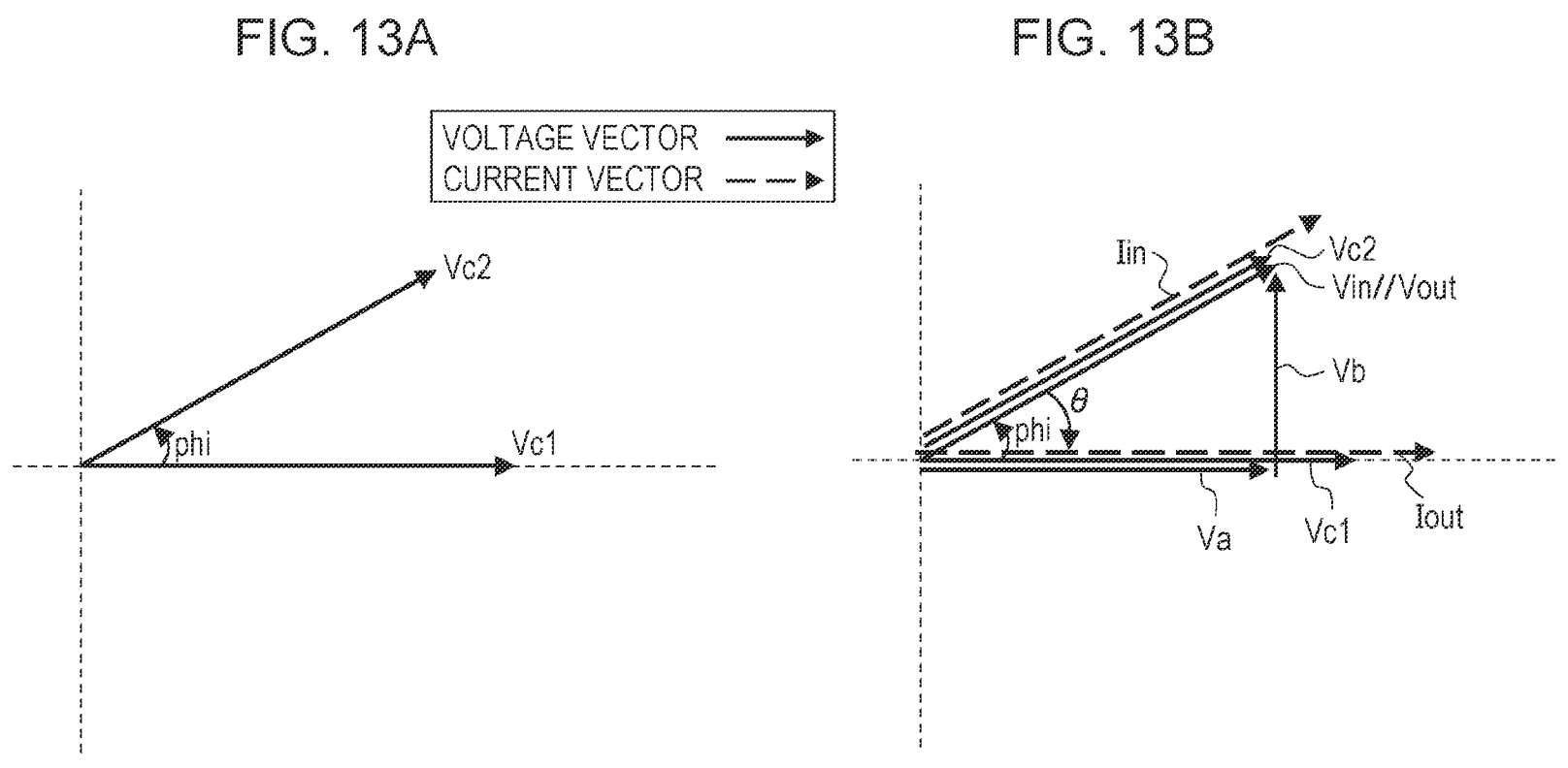

FIG. 13A is a vector diagram for describing the advantages of phase compensation by the phase compensator 400. The phase compensator 400 functions so as to advance the control voltage Vc2 by the amount of phase compensation φ with reference to the control voltage Vc1. Accordingly, the vector of the control voltage Vc2 is oriented to a direction the phase of which advances by the amount of phase compensation φ with respect to the vector of the control voltage Vc1. In the second embodiment, the amount of phase compensation φ meets Expression (5) described above.

The phase relationship between the control voltage Vc1 and the current Iout to flow into the motor 104 will now be described with reference to FIG. 13B. FIG. 13B is a vector diagram indicating the phase relationship between the voltages Vc1, Vc2, Vin, Vout, Va, and Vb and the currents Iin and Iout. Referring to FIG. 13A and FIG. 13B, the upper direction of the vertical axis represents the orientation of the phase lead and the lower direction of the vertical axis represents the orientation of the phase lag.

As described above with reference to FIG. 13A, the phase difference of the amount of phase compensation φ exists between the control voltage Vc1 and the control voltage Vc2. Accordingly, the vector of the control voltage Vc2 is oriented to a direction the phase of which advances by the amount of phase compensation φ with respect to the vector of the control voltage Vc1.

The phase of the control voltage Vc2 input into the voltage control current source 100, the phase of the voltage Vin output from the voltage control current source 100, and the phase of the current Iin output from the voltage control current source 100 coincide with each other, as described above. Accordingly, the direction of the vector of the control voltage Vc2, the direction of the vector of the voltage Vin, and the direction of the vector of the current Iin coincide with each other.

The linear relationship is established between the voltage Vin input into the wireless power transmission system 200 and the voltage Vout output from the wireless power transmission system 200. In other words, the direction of the vector of the voltage Vin coincides with the direction of the vector of the voltage Vout. Since the wireless power transmission system 200 immediately outputs the voltage Vin input between the lead wires 201*a* and 201*b* as the voltage Vout between the lead wires 206*a* and 206*b*, as assumed above, the direction of the vector of the voltage Vin coincides with the direction of the vector of the voltage Vout.

The phase relationship between the voltages Vout, Va, and Vb and the current Iout is the same as the relationship described above with reference to FIG. 7A. Specifically, since the vector of the voltage Va with respect to the vector of the current Iout indicates a voltage drop occurring at the resistor 102, the direction of the vector of the voltage Va coincides with the direction of the vector of the current Iout. In other words, the voltage Va has no lead and no lag with respect to the current Iout. In contrast, the vector of the voltage Vb advances by 90 degrees with respect to the vector of the current Iout due to the influence of the reactance of the inductor 103. The vector of the voltage Vout, which is represented as combination of the vector of the voltage Va and the vector of the voltage Vb, advances by the phase difference θ with respect to the vector of the current Iout. In reverse representation of the reference of the voltage and the current, the vector of the current Iout is delayed with respect to the vector of the voltage Vout by the phase difference θ. The phase difference θ is represented by Expression (1) indicated above. Since the amount of phase compensation φ meets Expression (5) described above, the phase difference occurring between the control voltage Vc1 and the current Iout to flow into the motor 104 is approximately zero.

As described above, according to the second embodiment, the control apparatus 410 has the advantage of reducing the phase difference between the phase of the control voltage Vc1 and the phase of the current Iout for driving the motor 104, as in the first embodiment. Two configuration examples will now be described as specific examples of the configuration of the phase compensator 400.

Figure 14:
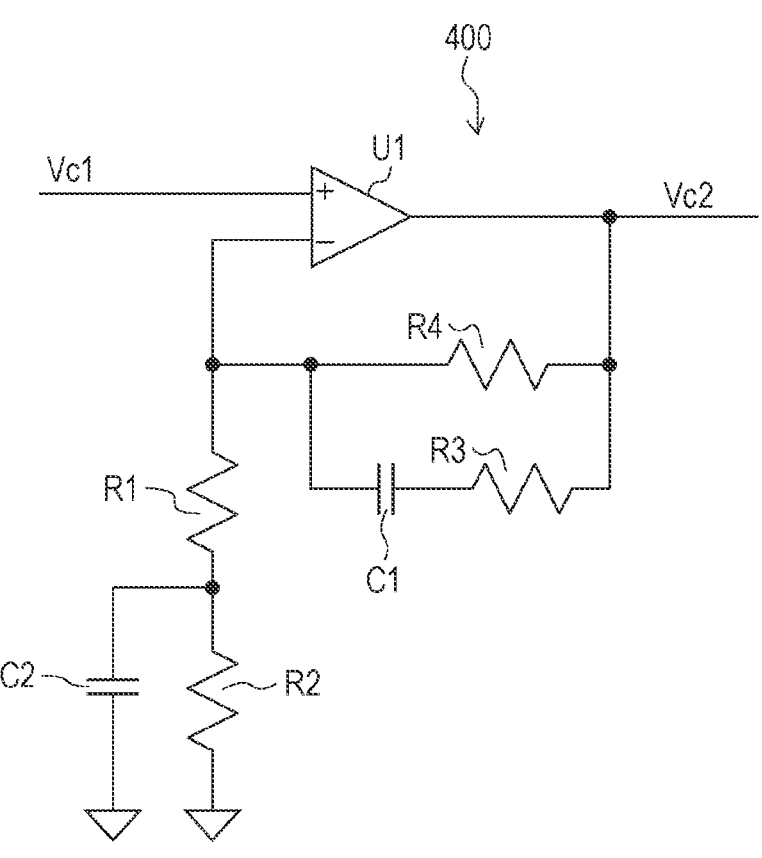
FIG. 14 is a diagram illustrating an example of the configuration of the phase compensator composed of an analog circuit.

FIG. 14 is a diagram illustrating an example of the configuration of the phase compensator 400 composed of an analog circuit using an operational amplifier U1. The phase compensator 400 includes the operational amplifier U1, resistors R1 to R4, and capacitors C1 and C2 and has a configuration based on a non-inverting amplifier circuit. For example, the resistor R1 has a resistance of 300 Ω, the resistor R2 has a resistance of 10 kΩ, the resistor R3 has a resistance of 400 Ω, and the resistor R4 has a resistance of 1.2 kΩ. The capacitor C1 has a capacitance of 0.2 g and the capacitor C2 has a capacitance of 0.3 μF. The phase compensator 400 receives the control voltage Vc1 based on ground potential and gains the control voltage Vc2 based on the ground potential.

Figure 15A:
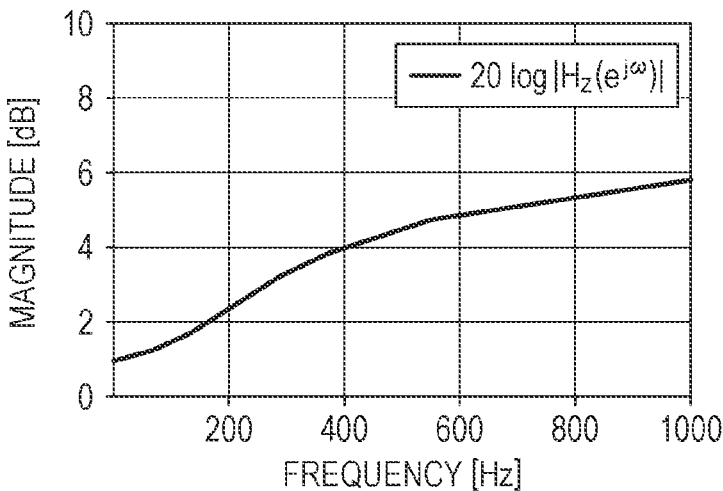
FIG. 15A and FIG. 15B are graphs indicating transmission characteristics of the phase compensator.
Figure 15B:
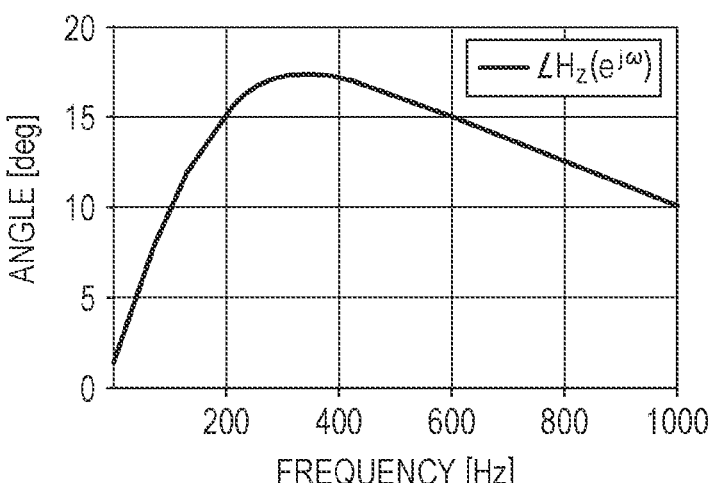

FIG. 15A and FIG. 15B are graphs indicating transmission characteristics of the phase compensator 400 in FIG. 14.

Referring to FIG. 15A, the horizontal axis represents frequency and the vertical axis represents the ratio in amplitude (power) of the control voltage Vc2 to the control voltage Vc1 in units of dB. Referring to FIG. 15B, the horizontal axis represents frequency and the vertical axis represents the phase difference between the control voltage Vc1 and the control voltage Vc2 in units of degrees.

Attention has mainly been given to the phase relationship between the control voltage Vc1 and the current Iout to flow into the motor 104 in the above description. In contrast, the amplitude relationship between the control voltage Vc1 and the current Iout to flow into the motor 104 is not considered so much. Since the phase difference between the control voltage Vc1 and the current Iout to flow into the motor 104 generally has a higher impact on the performance, the second embodiment concentrates on improvement of the phase relationship.

However, when the wireless power transmission system 200 is used, the application of the wireless power transmission system 200 has no small influence on the amplitude relationship. Accordingly, varying the amplitude relationship between the control voltage Vc1 and the current Iout to flow into the motor 104 at each frequency with the phase compensator 300 or the phase compensator 400, like the amplitude characteristic illustrated in FIG. 15A, is not denied in the second embodiment. The use of the phase compensator 300 or the phase compensator 400 enables the improvement effect of the control apparatus 310 or 410 to which the wireless power transmission system 200 is applied to be enforced.

Figure 16:
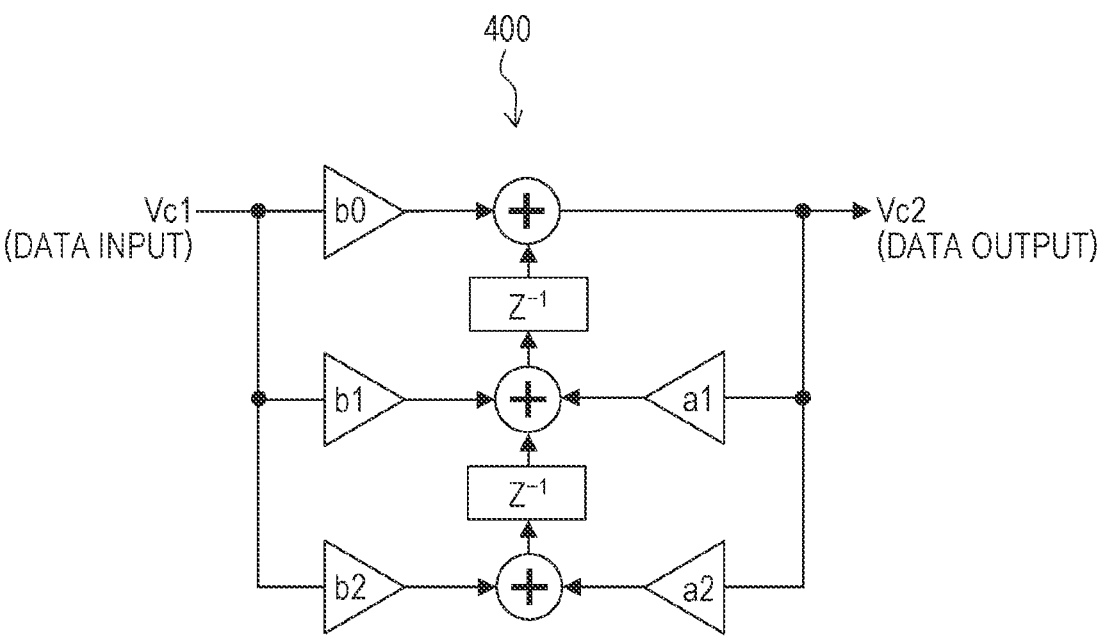
FIG. 16 is a diagram illustrating an example of the configuration of the phase compensator using a digital filter.

FIG. 16 is a diagram illustrating an example of the configuration of the phase compensator 400 using an infinite impulse response (IIR) digital filter. The phase compensator 400 receives the control voltage Vc1 and outputs the control voltage Vc2. This digital filter may be installed as software using digital operations. Similarly, this digital filter may be installed as a logic circuit using the FPGA.

Weighting coefficients a1, a2, b0, b1, and b2 in FIG. 16 are weighting coefficients for the IIR digital filter. For example, a1−−1.001815, a2=0.198548, b0=1.908796, b1−−2.090536, and b2=0.401394. The values of the weighting coefficients a1, a2, b0, b1, and b2 are derived through Z conversion using bilinear transform for the phase compensator 400 composed of the analog circuit using the operational amplifier U1 illustrated in FIG. 14. Accordingly, when the values of the weighting coefficients a1, a2, b0, b1, and b2 are used in the IIR digital filter illustrated in FIG. 16, the transmission characteristics of the IIR digital filter illustrated in FIG. 16 are substantially equivalent to those in FIG. 15A and FIG. 15B.

The two specific configuration examples of the phase compensator 400 are described above. As apparent from these examples, the phase compensator 300 and the phase compensator 400 adopted in the first embodiment and the second embodiment, respectively, are capable of being practically realized and installed. Results of measurement of the advantages of the phase compensator 300 and the phase compensator 400 in the actual machine of the control apparatus to which the wireless power transmission system 200 is applied will be described in a third embodiment.

As described above, the voltage control current source 100 outputs the power based on the control voltages Vc1 and Vc2. Each of the control voltages Vc1 and Vc2 is an example of the control signal. The wireless power transmission system 200 is connected downstream of the voltage control current source 100. The wireless power transmission system 200 receives the first power and supplies the second power to the motor 104 through the wireless power transmission. The phase compensator 400 is a compensator and compensates the difference between the phase of the control voltage Vc1 and the phase of the current Iout output from the wireless power transmission system 200.

The phase of the current Iout output from the wireless power transmission system 200 is delayed with respect to the phase of the voltage Vout output from the wireless power transmission system 200, as illustrated in FIG. 13B. The voltage control current source 100 receives the control voltage Vc2. The phase compensator 400 is provided upstream of the voltage control current source 100. The phase compensator 400 receives the control voltage Vc1 and supplies the control voltage Vc2 the phase of which advances with respect to the phase of the control voltage Vc1 to the voltage control current source 100.

The phase compensator 400 may compensate the difference between the phase of the control voltage Vc1 and the phase of the current Iout output from the wireless power transmission system 200 and the difference between the amplitude of the control voltage Vc1 and the amplitude of the current Iout output from the wireless power transmission system 200.

Similarly, the phase compensator 300 in FIG. 10 may compensate the difference between the phase of the control voltage Vc and the phase of the current Iout output from the wireless power transmission system 200 and the difference between the amplitude of the control voltage Vc and the amplitude of the current Iout output from the wireless power transmission system 200.

The phase compensators 300 and 400 may be composed of the analog circuits, such as the one illustrated in FIG. 14. In addition, the phase compensators 300 and 400 may compensate the difference in phase using the digital operations illustrated in FIG. 16. The digital operations include both arithmetic processing of programs by a digital signal processor (DSP) or a personal computer and parallel arithmetic processing by a digital circuit using the FPGA.

The transmission characteristics of the phase compensators 300 and 400 are transmission characteristics that offset the phase difference between the current input into the wireless power transmission system 200 and the current output from the wireless power transmission system 200. The transmission characteristics of the phase compensators 300 and 400 may be transmission characteristics that offset the phase difference between the voltage input into the wireless power transmission system 200 and the current output from the wireless power transmission system 200.

As described above, according to the second embodiment, the control apparatus 410 drives the motor 104 with the current Iout output from the wireless power transmission system 200. The phase compensator 400 compensates the difference occurring between the phase of the control voltage Vc1 input into the control apparatus 410 and the phase of the current Iout for driving the motor 104, which is output from the wireless power transmission system 200, due to the electrical property of the wireless power transmission system 200. Reducing the difference by the phase compensator 400 enables the control speed and the control accuracy of the motor 104 to be improved.

Third Embodiment

The advantages of applying the phase compensator 300 or 400 in a positioning stage having the wireless power transmission system 200 installed thereon will now be described.

Figure 17:
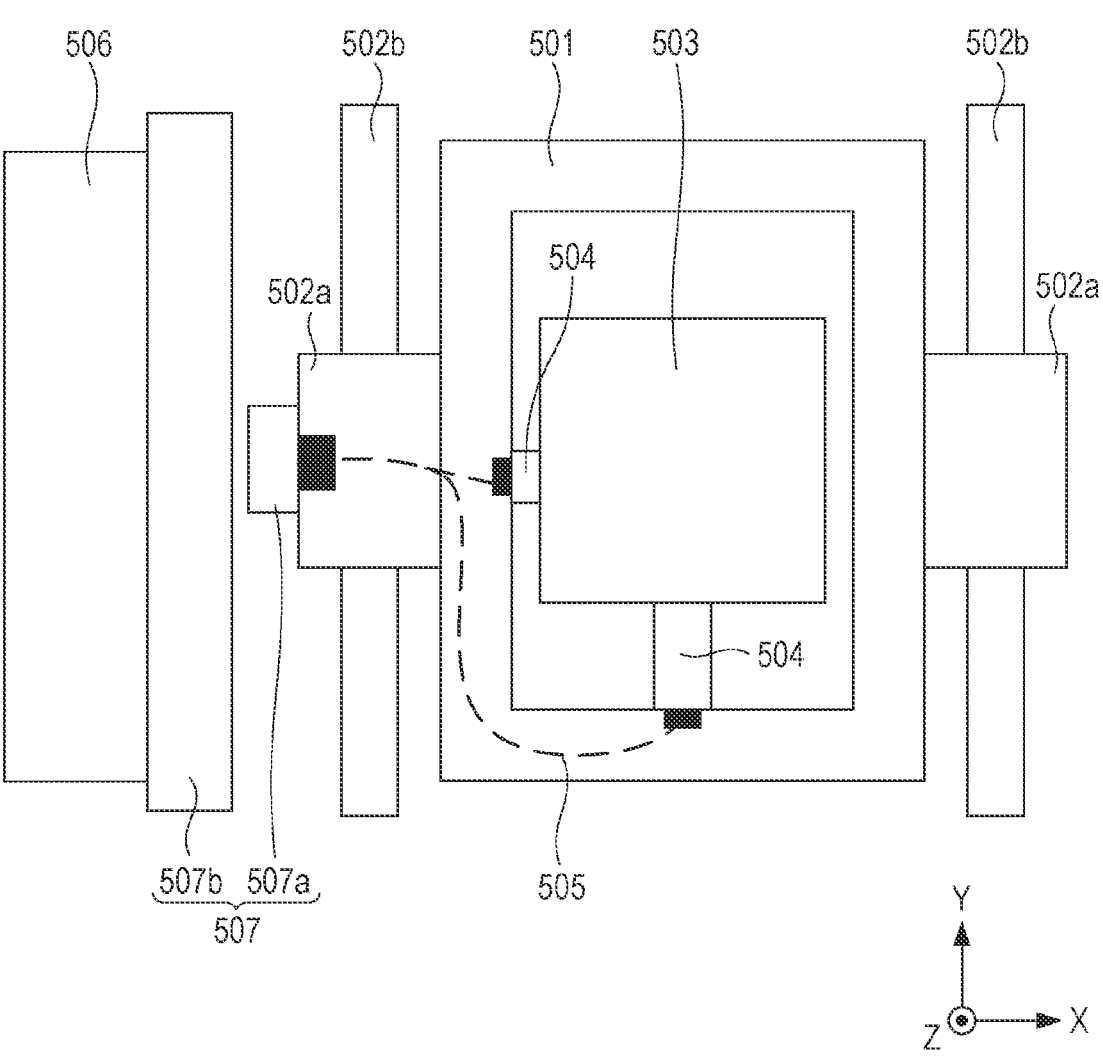
FIG. 17 is a top view illustrating an example of the configuration of a positioning stage.

FIG. 17 is a top view illustrating an example of the configuration of the positioning stage using a wireless power transmission system 507 for power supply to a linear motor. A stage on which reticle of a semiconductor exposure apparatus is installed is exemplified in the third embodiment. The positioning stage in the third embodiment includes a coarse-motion stage 501 having a large stroke and a fine-motion stage 503 having a high positioning accuracy.

A pair of needles 502a are provided at left and right sides of the driving direction (the Y-axis direction) of the coarse-motion stage 501. The pair of needles 502a are driven in the Y-axis direction in cooperation with the corresponding pair of stators 502b. A reflecting mirror (not illustrated) is provided on the coarse-motion stage 501. Measured light from a laser interferometer (a measurer) (not illustrated) is reflected by the reflecting minor to measure the amount of displacement or the position to the Y-axis direction of the stage.

The fine-motion stage 503 is connected to the coarse-motion stage 501 with a fine-motion linear motor 504 in a non-contact manner to be driven in the Y-axis direction with the coarse-motion stage 501. In addition, the fine-motion stage 503 is connected to the coarse-motion stage 501 also in the X-axis direction with the fine-motion linear motor 504 in a non-contact manner to be driven in the X-axis direction. A reflecting minor (not illustrated) is provided on the fine-motion stage 503. Measured light from a laser interferometer (a measurer) (not illustrated) is reflected by the reflecting mirror to measure the amounts of displacement or the positions to the X-axis direction and the Y-axis direction of the stage. The power to drive the fine-motion linear motor 504 is supplied from the linear motor driver 506. The power supplied from the linear motor driver 506 is transmitted to the fine-motion linear motor 504 via a power transmitter 507*b* and a power receiver 507*a* of the wireless power transmission system 507 and fine-motion linear motor cables 505.

The power transmitter 507*b* of the wireless power transmission system 507 detects current output from the linear motor driver 506 and transmits the power to the power receiver 507*a* via the power transmitter antenna. The power receiver 507*a* receives the power transmitted from the power transmitter 507*b* via the power receiver antenna and supplies the power to the fine-motion linear motor 504 via the rectifier circuit.

Figure 18:
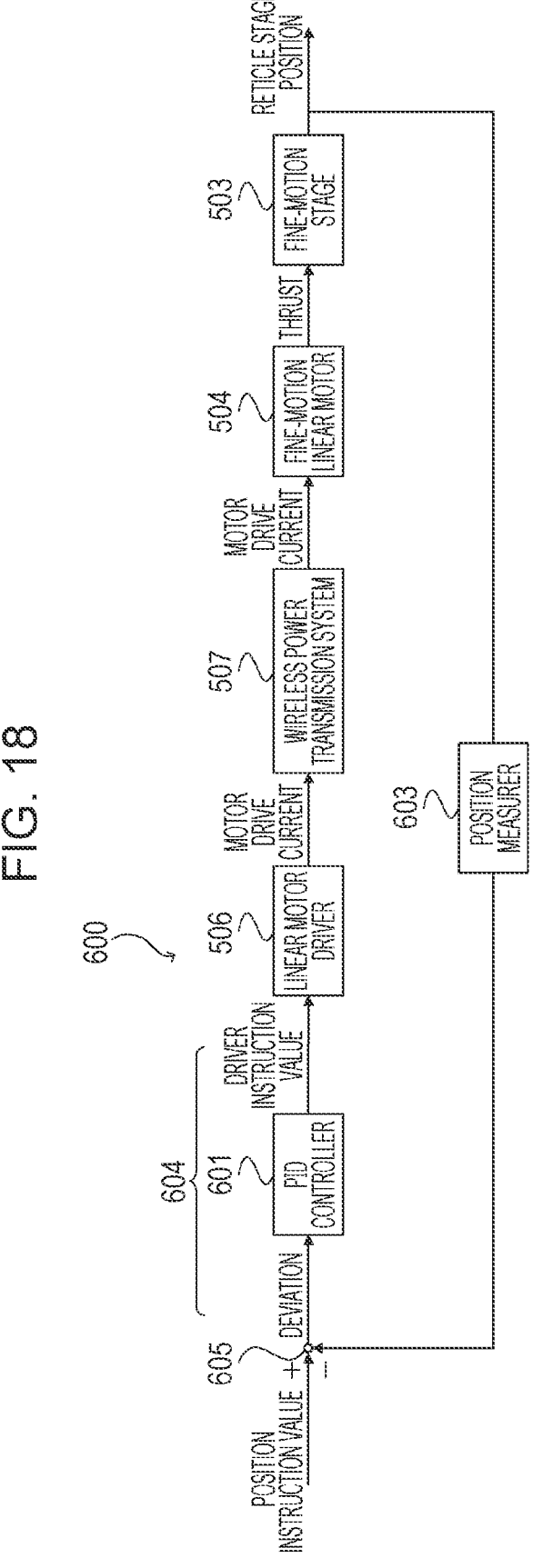
FIG. 18 is a diagram illustrating an example of the configuration of a control apparatus.

A control apparatus 600 for a position feedback control system of the fine-motion stage 503 with the fine-motion linear motor 504 will now be described with reference to FIG. 18. FIG. 18 is a diagram illustrating an example of the configuration of the control apparatus 600 when the phase compensator is not provided. The control apparatus 600 includes a subtracter 605, a compensator 604, the linear motor driver 506, the wireless power transmission system 507, the fine-motion linear motor 504, the fine-motion stage 503, and a position measurer 603. The linear motor driver 506 corresponds to the voltage control current source 100 in FIG. 10 or FIG. 12. The wireless power transmission system 507 corresponds to the wireless power transmission system 200 in FIG. 10 or FIG. 12. The fine-motion linear motor 504 corresponds to the motor 104 in FIG. 10 or FIG. 12.

The position of the fine-motion stage 503 is measured by the position measurer 603, such as a laser interferometer, and the measured position of the fine-motion stage 503 is supplied to the subtracter 605. The subtracter 605 supplies the difference (deviation) between the position of the fine-motion stage 503, which is measured by the position measurer 603, and a position instruction value (a target position) to the compensator 604. The compensator 604 includes, for example, a proportional-integral-derivative (PID) controller 601. The compensator 604 generates a driver instruction value for the linear motor driver 506 based on the deviation supplied from the subtracter 605. The linear motor driver 506 outputs the motor drive current based on the driver instruction value from the compensator 604. The motor drive current output from the linear motor driver 506 is received by the wireless power transmission system 507 and is supplied to the fine-motion linear motor 504 via a wireless antenna and the rectifier circuit. The fine-motion linear motor 504 applies the thrust to the fine-motion stage 503 in accordance with the supplied motor drive current.

Figure 19:
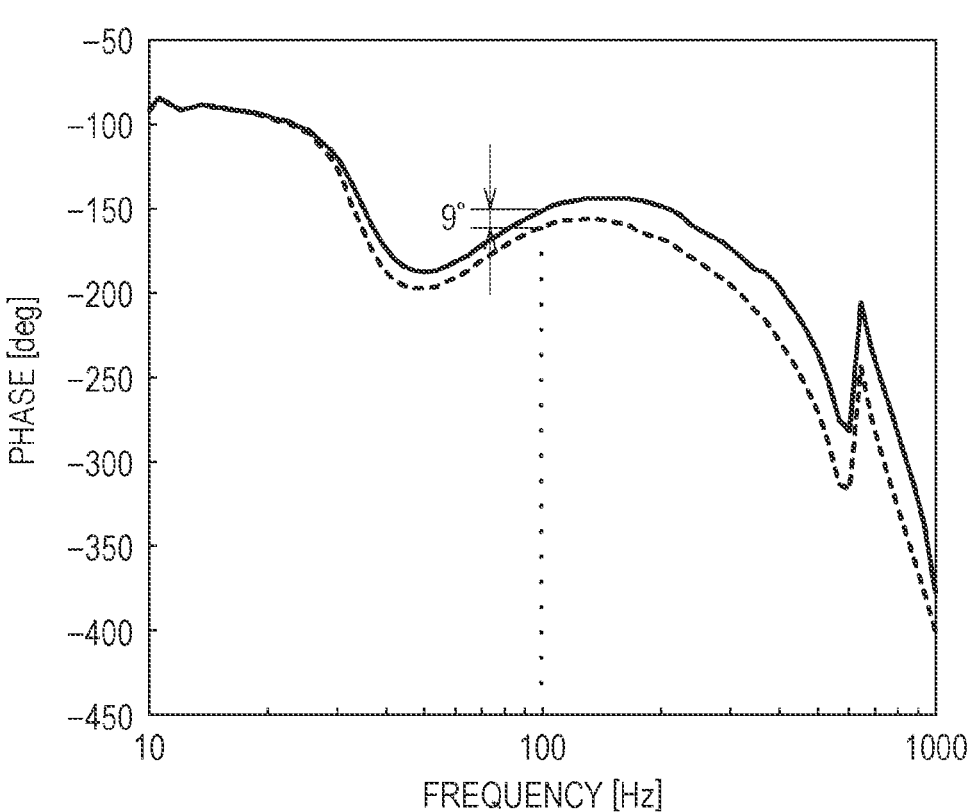
FIG. 19 is a graph indicating closed loop phase characteristics of a position feedback control system.
Figure 20:
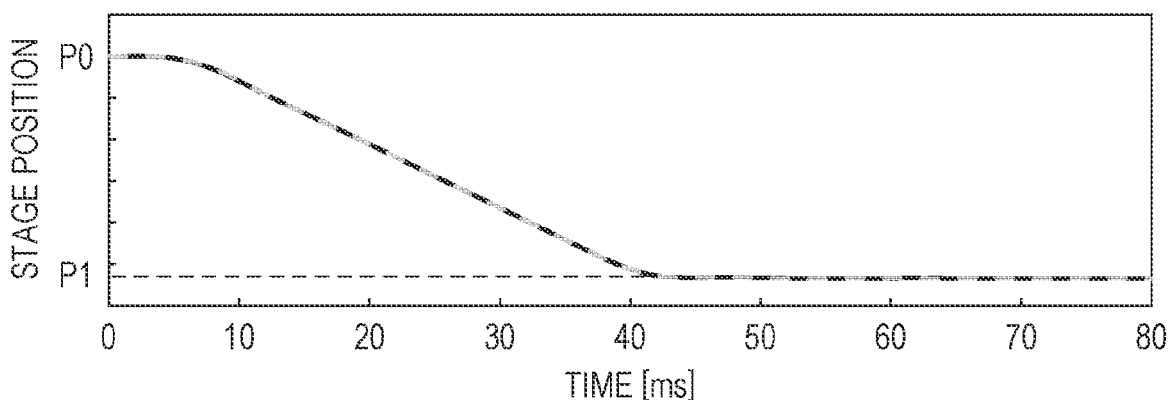
FIG. 20 is a graph indicating stage positions when a fine-motion stage is driven in the X-axis direction.
Figure 21:
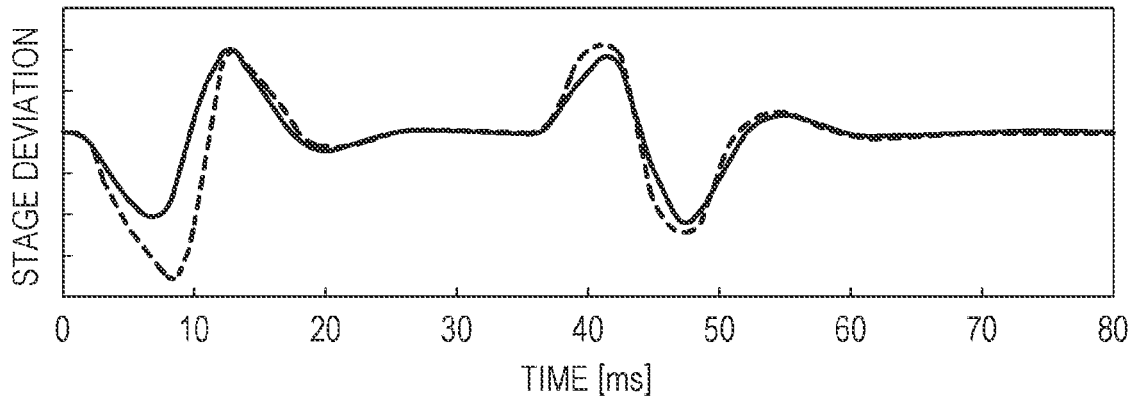
FIG. 21 is a graph indicating stage deviation when the fine-motion stage is driven.

FIG. 19 is a graph indicating closed loop phase characteristics of the position feedback control system in the X-axis direction of the fine-motion stage 503 when the power transmission is performed using the wireless power transmission system 507 and when the power transmission is performed using a wired manner (for example, using cables). Referring to FIG. 19, a solid line indicates the closed loop phase characteristic in the power transmission in the wired manner and a broke line indicates the closed loop phase characteristic in the power transmission using the wireless power transmission system 507. Comparison between the phase characteristic in the wired manner indicated by the solid line and the phase characteristic in the wireless power transmission indicated by the broken line indicates that the response of the wireless power transmission indicated by the broken line is delayed with respect to the response of the wired manner indicated by the solid line by 9 degrees, for example, when sinewaves of 100 Hz are input. The fine-motion stage 503 was driven in the X-axis direction from a stage position P0 to a stage position P1 in a manner illustrated in FIG. 20 in the state in which the phase of the wireless power transmission indicated by the broken line is delayed with respect to the phase of the wired manner indicated by the solid line. FIG. 21 indicates the stage deviation at that time. Referring to FIG. 21, a solid line indicates the stage deviation in the wired manner and a broken line indicates the stage deviation in the wireless power transmission. Since the response in the wireless power transmission indicated by the broken line is delayed with respect to the response in the wired manner indicated by the solid line, the control performance of the fine-motion stage 503 was degraded and the large stage deviation occurred.

FIG. 22A is a diagram illustrating an example of the configuration of a control apparatus 610 including a phase compensator 602. The control apparatus 610 in FIG. 22A results from addition of the phase compensator 602 to the control apparatus 600 in FIG. 18. The phase compensator 602 is provided between the PID controller 601 and the linear motor driver 506. The phase compensator 602 receives the value output from the PID controller 601, performs the phase compensation, and supplies the driver instruction value to the linear motor driver 506. The phase compensator 602 corresponds to the phase compensator 400 in FIG. 12.

The advantages of providing the phase compensator 602 in FIG. 22A will now be described. As described above, the phase characteristic in the power transmission using the wireless power transmission system 507 is delayed with respect to the phase characteristic in the wired manner. A transmission function H(z) of the phase compensator 602 having a characteristic advancing the phase so as to offset the delay of the phase characteristic is expressed by Expression (7):

[Formula 7]

$$H(z) = \frac{b_0 + b_1 z^{-1} + b_2 z^{-2}}{1 + a_1 z^{-1} + a_2 z^{-2}} \tag{7}$$

Figure 23:
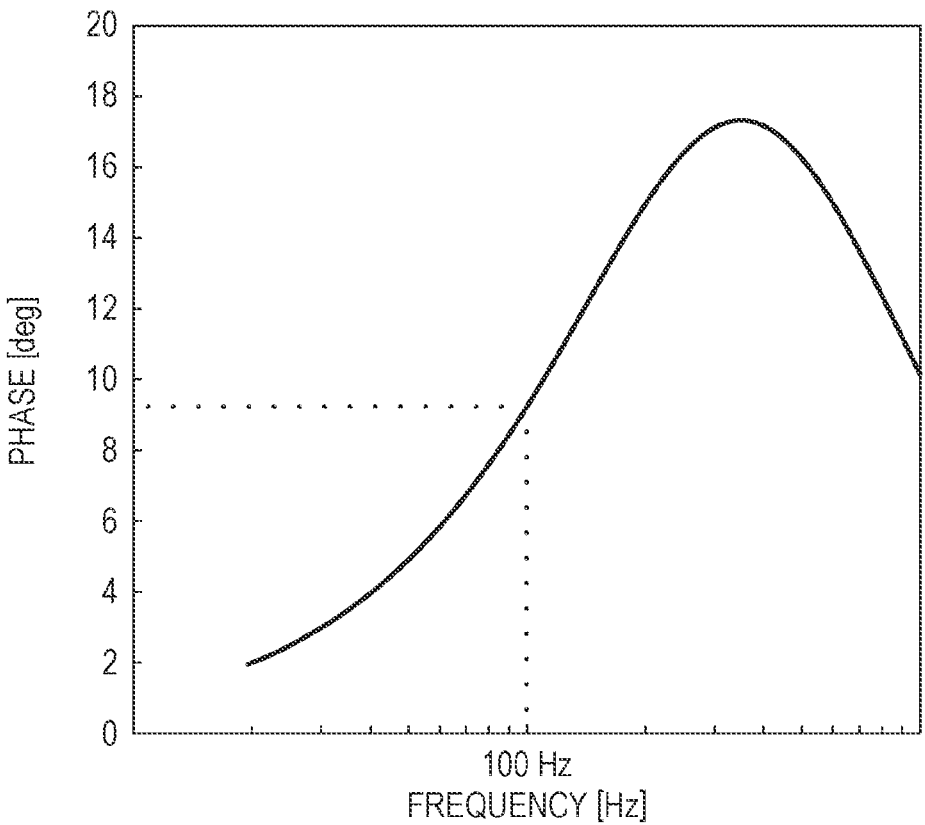
FIG. 23 is a graph indicating a phase characteristic of the phase compensator for compensating delay in the phase characteristic.

Coefficients a1, a2, b0, b1, and b2 in Expression (7) correspond to the weighting coefficients a1, a2, b0, b1, and b2 in FIG. 16. Although Expression (7) is an equation when the phase compensator 602 is installed as the digital circuit, the phase compensator 602 may be installed as the analog circuit. The weighting coefficients a1, a2, b0, b1, and b2 of the phase compensator 602 are adjusted so as to compensate the difference in the phase characteristic between the power transmission using the wireless power transmission system 507 and the power transmission in the wired manner. For example, the weighting coefficients a1, a2, b0, b1, and b2 have the following values to compensate the delay in the phase characteristic in FIGS. 19: a1—1.001815, a2=0.198548, b0=1.908796, b1—2.090536, and b2=0.401394. The phase compensator 602 having the characteristic in FIG. 23 is capable of being installed by using these weighting coefficients.

FIG. 22B is a diagram illustrating an example of the configuration of another control apparatus 620 including the phase compensator 602. The control apparatus 620 in FIG. 22B results from addition of the phase compensator 602 to the control apparatus 600 in FIG. 18. The phase compensator 602 is provided between the linear motor driver 506 and the wireless power transmission system 507. The phase compensator 602 receives the motor drive current output from the linear motor driver 506, performs the phase compensation, and supplies the motor drive current to the wireless power transmission system 507. The phase compensator 602 corresponds to the phase compensator 300 in FIG. 10.

Figure 24:
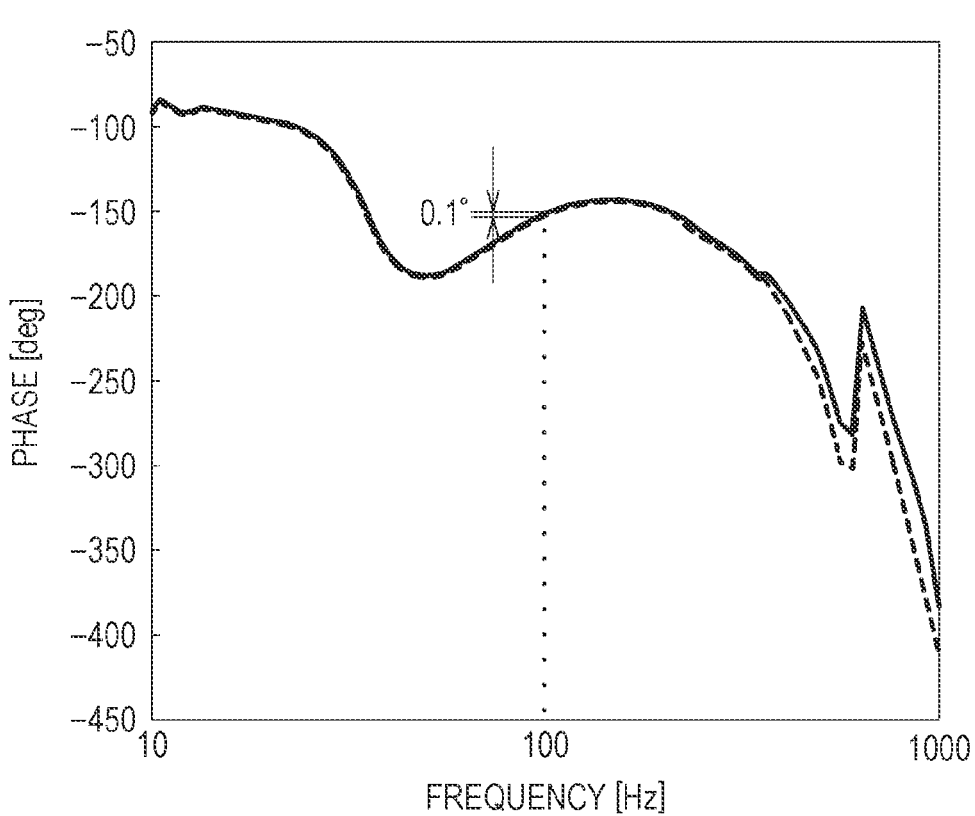
FIG. 24 is a graph indicating the closed loop phase characteristics of the position feedback control system.
Figure 25:
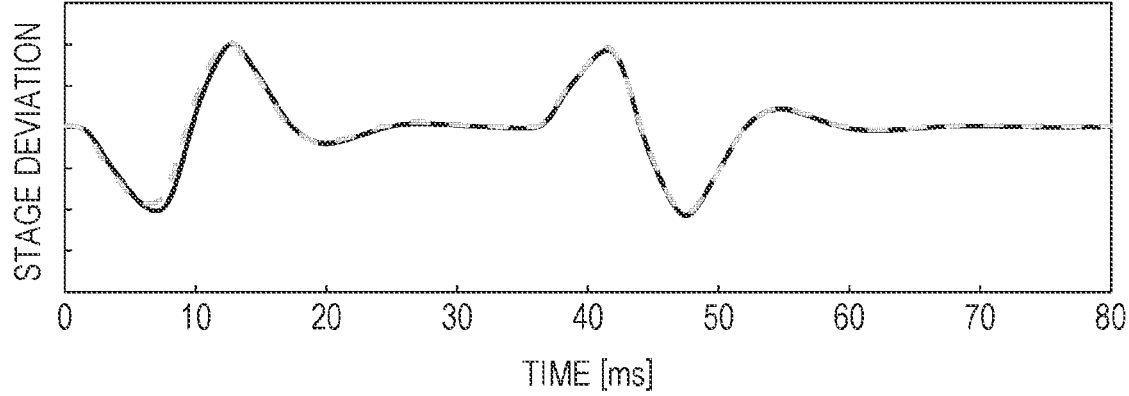
FIG. 25 is a graph indicating the stage deviation when the fine-motion stage is driven.

FIG. 24 is a graph indicating the closed loop phase characteristics of the position feedback control system in the X-axis direction of the fine-motion stage 503 when the power transmission is performed using the wireless power transmission system 507 with phase compensator 602 in FIG. 22B and when the power transmission is performed using the wired manner. Referring to FIG. 24, a solid line indicates the closed loop phase characteristic in the power transmission in the wired manner and a broke line indicates the closed loop phase characteristic in the power transmission using the wireless power transmission system 507. Comparison between the phase characteristic in the wired manner indicated by the solid line and the phase characteristic in the wireless power transmission indicated by the broken line indicates that the response of the wireless power transmission indicated by the broken line is delayed with respect to the response of the wired manner indicated by the solid line by 0.1 degrees, that is, little delay occurs, for example, when sinewaves of 100 Hz are input. The fine-motion stage 503 was driven in the same manner as in FIG. 20 in the state in which the closed loop phase characteristic in the wired manner indicated by the solid line substantially coincides with the closed loop phase characteristic in the wireless power transmission indicated by the broken line. FIG. 25 indicates the stage deviation at that time. Referring to FIG. 25, a solid line indicates the stage deviation in the wired manner and a broken line indicates the stage deviation in the wireless power transmission. Since the phase characteristic of the fine-motion stage 503 in the wireless power transmission indicated by the broken line was equivalent to the phase characteristic of the fine-motion stage 503 in the wired manner indicated by the solid line, the control performance of the fine-motion stage 503 in the wireless power transmission was equivalent to that in the wired manner. As a result, the stage deviation in the wireless power transmission was equivalent to the stage deviation in the wired manner.

As described above, the fine-motion linear motor 504 corresponds to the motor 104 of the first and second embodiments and applies the thrust to the fine-motion stage 503, which is driven with an object being held. The fine-motion stage 503 is a stage apparatus.

At least one fine-motion linear motor 504 may be configured on the fine-motion stage 503. In this case, the wireless power transmission system 507 is connected to each fine-motion linear motor 504. The wireless power transmission system 507 transmits the power to at least one fine-motion linear motor 504.

The above embodiments are only examples to embody the aspects of the invention and provide disclosure. The scope of the invention is not limitedly interrupted solely by the disclosed embodiments. In other words, the invention and accompanying disclosure may be embodied in various modes without departing from the technical idea or the main features recited, individually or in combination, in the claims.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. Each of the embodiments of the present invention described above can be implemented solely or as a combination of a plurality of the embodiments or features thereof where necessary or where the combination of elements or features from individual embodiments in a single embodiment is beneficial. The scope of the following claims is to be accorded the broadest interpretation so as to encompass all such modifications and equivalent structures and functions.

This application claims the benefit of Japanese Patent Application No. 2022-155990, filed Sep. 29, 2022, which is hereby incorporated by reference herein in its entirety.

What is claimed is:

1. A control apparatus comprising:
   a driver configured to output power based on a first control signal;
   a wireless power transmission system configured to be connected downstream of the driver, to receive first power, and to output second power to a motor through wireless power transmission; and
   a compensator configured to reduce a difference between a phase of the first control signal and a phase of current output from the wireless power transmission system,
   wherein the compensator reduces the difference between the phase of the first control signal and the phase of the current output from the wireless power transmission system and a difference between an amplitude of the first control signal and an amplitude of the current output from the wireless power transmission system.

2. The control apparatus according to claim 1,
wherein the phase of the current output from the wireless
power transmission system is delayed with respect to a
phase of voltage output from the wireless power trans-
mission system, and
wherein the compensator is provided between the driver
and the wireless power transmission system, receives
the power output from the driver, and supplies to the
wireless power transmission system the first power in
which a phase of voltage input into the wireless power
transmission system advances with respect to a phase
of voltage output from the driver.

3. The control apparatus according to claim 1, wherein the
phase of the current output from the wireless power trans-
mission system is delayed with respect to a phase of voltage
output from the wireless power transmission system,
wherein the driver receives a second control signal, and
wherein the compensator is provided upstream of the
driver, receives the first control signal, and supplies to
the driver the second control signal a phase of voltage
of which advances with respect to a phase of voltage of
the first control signal.

4. The control apparatus according to claim 1,
wherein the compensator reduces a difference between a
phase of voltage of the first control signal and the phase
of the current output from the wireless power trans-
mission system.

5. The control apparatus according to claim 1,
wherein the compensator is composed of an analog cir-
cuit.

6. The control apparatus according to claim 1,
wherein the compensator reduces the difference using
digital operations.

7. The control apparatus according to claim 1,
wherein transmission characteristics of the compensator
are transmission characteristics that offset a phase
difference between current input into the wireless
power transmission system and the current output from
the wireless power transmission system.

8. The control apparatus according to claim 1,
wherein transmission characteristics of the compensator
are transmission characteristics that offset a phase
difference between voltage input into the wireless
power transmission system and the current output from
the wireless power transmission system.

9. The control apparatus according to claim 1,
wherein the wireless power transmission system includes
a power transmitter antenna configured to perform
wireless power transmission;
a power receiver antenna configured to wirelessly
receive power from the power transmitter antenna;

a switch circuit configured to switch the first power
based on a first switching signal to apply voltage to
the power transmitter antenna; and
a rectifier circuit configured to rectify voltage output
from the power receiver antenna based on a second
switching signal to apply the rectified voltage to the
motor, and
wherein the switch circuit and the rectifier circuit each
include a plurality of bi- directional switches.

10. The control apparatus according to claim 9,
wherein the first switching signal has the same period as
that of the second switching signal.

11. The control apparatus according to claim 9,
wherein the bi-directional switches of the switch circuit
are driven with the first switching signal based on
potential of source terminals of the bi-directional
switches, and
wherein the bi-directional switches of the rectifier circuit
are driven with the second switching signal based on
potential of source terminals of the bi-directional
switches.

12. The control apparatus according to claim 1,
wherein the motor is a linear motor and applies thrust to
a stage apparatus that is driven with an object being
held.

13. The control apparatus according to claim 12,
wherein at least one linear motor is configured on the state
apparatus and the wireless power transmission system
is connected to each linear motor.

14. The control apparatus according to claim 12,
wherein the wireless power transmission system transmits
the power to the at least one linear motor.

15. A method of controlling a control apparatus, the
method comprising:
outputting power based on a first control signal by a
driver;
receiving first power by a wireless power transmission
system connected downstream of the driver and out-
putting second power to a motor through wireless
power transmission; and
reducing a difference between a phase of the first control
signal and a phase of current output from the wireless
power transmission system by a compensator,
wherein the compensator reduces the difference between
the phase of the first control signal and the phase of the
current output from the wireless power transmission
system and a difference between an amplitude of the
first control signal and an amplitude of the current
output from the wireless power transmission system.

* * * * *